(12) United States Patent
Sartiaux et al.

(10) Patent No.: US 12,115,824 B2
(45) Date of Patent: Oct. 15, 2024

(54) CONFIGURABLE INTERCONNECTED SUSPENSION SYSTEM

(71) Applicant: Rivian IP Holdings, LLC, Irvine, CA (US)

(72) Inventors: Christophe Sartiaux, Woking (GB); Andrea Damiani, Irvine, CA (US); Allen Orchard, Shepperton (GB); David Steven Mayes Houser, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 136 days.

(21) Appl. No.: 17/706,437

(22) Filed: Mar. 28, 2022

(65) Prior Publication Data

US 2023/0302864 A1    Sep. 28, 2023

(51) Int. Cl.
*B60G 17/015*    (2006.01)

(52) U.S. Cl.
CPC ............. *B60G 17/0155* (2013.01); *B60G 2204/4106* (2013.01); *B60G 2400/204* (2013.01); *B60G 2400/41* (2013.01); *B60G 2600/17* (2013.01)

(58) Field of Classification Search
CPC ........ B60G 17/0155; B60G 2204/4106; B60G 2400/204; B60G 2400/41; B60G 2600/17
See application file for complete search history.

(56) References Cited

U.S. PATENT DOCUMENTS

| | | |
|---|---|---|
| 1,647,518 A | 11/1927 | Hawley, Jr. |
| 3,752,497 A | 8/1973 | Enke et al. |
| 3,778,081 A | 12/1973 | Takahashi et al. |

(Continued)

FOREIGN PATENT DOCUMENTS

| | | |
|---|---|---|
| DE | 3427508 A1 | 2/1986 |
| WO | WO 2008141387 | 11/2008 |

OTHER PUBLICATIONS

Cao et al., "Handling and Braking Analyses of a Heavy Vehicle with a Cross-Axle Fluidically-Coupled Suspension," SAE Int. J. Commer. Veh. 1(1):406-415, 2009, https://doi.org/10.4271/2008-01-2672.

Cao et al., "Property Analysis of an X-Coupled Suspension for Sport Utility Vehicles," 2009, SAE Int. J. Passeng. Cars—Mech. Syst. 1(1):853-862.

(Continued)

*Primary Examiner* — Frank B Vanaman
(74) *Attorney, Agent, or Firm* — Haley Guiliano LLP

(57) ABSTRACT

A vehicle includes a suspension system for providing configurable stiffness and damping. The system includes a plurality of hydraulic cylinders, each corresponding to a respective wheel of the vehicle, and one or more valve assemblies for controlling hydraulic fluid in the plurality of hydraulic cylinders to achieve a plurality of suspension modes affecting bounce, pitch, roll, and warp. The system also includes a plurality of accumulators acting as spring elements for storing and releasing the hydraulic fluid as the plurality of hydraulic cylinders compress and rebound. The system includes control circuitry for controlling the valve assemblies to achieve one or more suspension modes defining bounce, pitch, roll, and warp stiffnesses. By generating control signals for the valve assemblies, various interconnections or fluid paths can be achieved, corresponding to the suspension modes. The hydraulic cylinders are double acting, with rebound and compression volumes, and may be coupled to damping valves.

19 Claims, 9 Drawing Sheets

(56) References Cited

U.S. PATENT DOCUMENTS

| | | | |
|---|---|---|---|
| 3,895,816 A | 7/1975 | Takahashi et al. | |
| 4,620,694 A | 11/1986 | Padgett | |
| 4,936,424 A | 6/1990 | Costa | |
| 5,043,893 A * | 8/1991 | Aburaya | B60G 17/017 |
| | | | 280/5.514 |
| 5,056,812 A * | 10/1991 | Takehara | B60G 17/0162 |
| | | | 280/5.513 |
| 5,123,506 A | 6/1992 | Sirven | |
| 5,215,327 A * | 6/1993 | Gatter | B60G 17/0272 |
| | | | 267/225 |
| 5,265,913 A | 11/1993 | Scheffel | |
| 5,475,593 A * | 12/1995 | Townend | B60G 17/018 |
| | | | 280/DIG. 1 |
| 5,562,305 A | 10/1996 | Heyring | |
| 5,601,306 A | 2/1997 | Heyring | |
| 5,619,413 A * | 4/1997 | Oakley | B60G 17/017 |
| | | | 280/5.514 |
| 5,785,344 A | 7/1998 | Vandewal et al. | |
| 6,338,014 B2 | 1/2002 | Heyring et al. | |
| 6,345,706 B1 | 2/2002 | Oliver et al. | |
| 6,519,517 B1 | 2/2003 | Heyring et al. | |
| 6,761,371 B1 | 7/2004 | Heyring et al. | |
| 6,942,230 B1 | 9/2005 | Fontdecaba Buj | |
| 7,240,906 B2 * | 7/2007 | Klees | B60G 21/10 |
| | | | 280/5.502 |
| 7,360,777 B2 | 4/2008 | Mizuno et al. | |
| 7,487,973 B1 * | 2/2009 | Kesselgruber | B60G 21/073 |
| | | | 280/5.506 |
| 7,637,516 B2 | 12/2009 | Mizuno et al. | |
| 7,686,309 B2 | 3/2010 | Munday et al. | |
| 8,123,235 B2 | 2/2012 | Monk et al. | |
| 10,178,863 B2 | 1/2019 | Schnaider et al. | |
| 10,434,835 B2 * | 10/2019 | Six | F15B 13/027 |
| 11,390,129 B1 | 7/2022 | Edren | |
| 11,524,541 B2 | 12/2022 | Corsico | |
| 2003/0094774 A1 * | 5/2003 | Burdock | B60G 17/0162 |
| | | | 280/5.502 |
| 2004/0169345 A1 | 9/2004 | Fontdecaba Buj | |
| 2004/0195796 A1 | 10/2004 | Heo | |
| 2005/0225048 A1 * | 10/2005 | Kasamatsu | B60G 17/056 |
| | | | 280/124.16 |
| 2008/0272561 A1 | 11/2008 | Monk et al. | |
| 2012/0029770 A1 * | 2/2012 | Hirao | B60G 17/08 |
| | | | 701/1 |
| 2018/0134107 A1 | 5/2018 | Von et al. | |
| 2020/0094646 A1 | 3/2020 | Hoshino et al. | |
| 2020/0164713 A1 | 5/2020 | Kim | |
| 2022/0203801 A1 | 6/2022 | Navarrete | |
| 2022/0380004 A1 | 12/2022 | Walker et al. | |
| 2023/0080108 A1 | 3/2023 | Timoney | |

OTHER PUBLICATIONS

Shao, "Modeling and Model Analysis of a Full-Car Fitted with an Anti-Pitch Anti-Roll Hydraulically Interconnected Suspension," SAE Technical Paper 2014-01-0849, 2014, doi:10.4271/2014-01-0849.

Shimokawa et al., "HBMC (Hydraulic Body Motion Control System) for Production Vehicle Application," 2011, SAE Technical Paper 2011-01-0563.

Smith et al., "Recent developments in passive interconnected vehicle suspension," Frontiers of Mechanical Engineering in China, 5(1):1-18 (2010).

Wang et al., "Design and Experimental Investigation of Demand Dependent Active Suspension for Vehicle Rollover Control," in Joint 48th IEEEE Conference on Decision and Control and 28th Chinese Control Conference, 2009, pp. 5158-5163.

Wilde et al., "Experimental Evaluation of Fishhook Maneuver Performance of a Kinetic Suspension System," SAE Technical Paper 2005-01-0392, 2005, https://doi.org/10.4271/2005-01-0392.

Zhang et al., "Modeling of a New Active Suspension for Roll Control," 13th Asia Pacific Vibration Conference, 2009.

U.S. Appl. No. 17/961,377, filed Oct. 6, 2022, Andrea Damiani.

* cited by examiner

CONFIGURABLE INTERCONNECTED SUSPENSION SYSTEM

INTRODUCTION

The present disclosure is directed to a configurable interconnected suspension system for achieving suspension stiffness.

SUMMARY

The present disclosure is directed to a system for providing configurable stiffness and damping characteristics. In some embodiments, the system includes a plurality of hydraulic cylinders, one or more valve assemblies, and a plurality of accumulators. The plurality of hydraulic cylinders, which may be synchronous or non-synchronous, each correspond to a respective wheel of a vehicle. The valve assembly is configured for controlling hydraulic fluid in the plurality of hydraulic cylinders to achieve a plurality of suspension modes affecting bounce, pitch, roll, and warp. The plurality of accumulators act as spring elements for storing and releasing the hydraulic fluid as the plurality of hydraulic cylinders compress and rebound.

In some embodiments, each hydraulic cylinder of the plurality of the hydraulic cylinders is a double-acting hydraulic cylinder, each hydraulic cylinder includes a compression volume and a rebound volume, and each compression volume of the plurality of hydraulic cylinders is coupled to a rebound volume of another hydraulic cylinder (e.g., via a respective fluid path), and to first and second control valves. In some embodiments, each compression volume of the plurality of hydraulic cylinders is in fluid communication along a respective fluid path with a rebound volume of another hydraulic cylinder, and with the valve assembly. In some embodiments, a respective accumulator of the plurality of accumulators is arranged along each respective fluid path for storing hydraulic fluid flowing along the respective fluid path.

In some embodiments, the valve assembly includes a first valve block and a second valve block. In some embodiments, the first valve block includes a first port, a second port, a third port and a fourth port. The first port is coupled to a first rebound volume of a first hydraulic cylinder, the second port is coupled to a second rebound volume of a second hydraulic cylinder, the third port is coupled to a first compression volume of the first hydraulic cylinder, and the fourth port is coupled to a second compression volume of the second hydraulic cylinder. In some embodiments, the second valve block includes a fifth port, a sixth port, a seventh port and an eighth port. The fifth port is coupled to a third rebound volume of a third hydraulic cylinder, the sixth port is coupled to a fourth rebound volume of a fourth hydraulic cylinder, the seventh port is coupled to a third compression volume of the third hydraulic cylinder, and the eighth port is coupled to a fourth compression volume of the fourth hydraulic cylinder. In some embodiments, the valve assembly includes one or more pressure relief valves each having a respective cracking pressure.

In some embodiments, each of the first valve block and the second valve block is configured to achieve a first state, a second state, and a third state. In the first state, the first port is coupled to the third port, the second port is coupled to the fourth port. In the second state, the first, second, third, and fourth ports are isolated from each other. In the third state, the first port is coupled to the fourth port, the second port is coupled to the third port.

In some embodiments, each suspension mode of the plurality of suspension modes defines one or more vehicle motion modes selected from among a bounce mode, a pitch mode, a roll mode, and a warp mode.

In some embodiments, the system includes a plurality of damping valves coupled to the plurality of hydraulic cylinders, wherein each damping valve is configured to restrict flow in at least one direction.

In some embodiments, the system includes control circuitry coupled to the valve assembly and configured to select a suspension mode from the plurality of suspension modes, and transmit a control signal to the valve assembly indicative of the suspension mode.

In some embodiments, the present disclosure is directed to a suspension system. The suspension system includes a first shock absorber (FL) having a double-acting cylinder, a second shock absorber (FR) having a double-acting cylinder, a third shock absorber (RL) having a double-acting cylinder, and a fourth shock absorber (RR) having a double-acting cylinder. The suspension system also includes a first valve block coupled to the first, second, third, and fourth shock absorbers. The suspension system also includes a second valve block coupled to the first, second, third, and fourth shock absorbers. The suspension system also includes four accumulators each coupled to at least one compression volume and at least one rebound volume of the first, second, third, or fourth shock absorbers.

In some embodiments, each shock absorber includes a respective compression volume and a respective rebound volume. For example, in some embodiments, (i) the compression volume of the RL shock absorber is coupled to the rebound volume of the FR shock absorber, to a first port of the first valve block, and to a first port of the second valve block, (ii) the compression volume of the RR shock absorber is coupled to the rebound volume of the FL shock absorber, to a second port of the first valve block, and to a second port of the second valve block, (iii) the compression volume of the FR shock absorber is coupled to the rebound volume of the RL shock absorber, to a third port of the first valve block, and to a third port of the second valve block, and (iv) the compression volume of the FL shock absorber is coupled to the rebound volume of the RR shock absorber, to a fourth port of the first valve block, and to a fourth port of the second valve block.

In some embodiments, a suspension mode includes (i) the first valve block decoupling a rebound volume of the FL shock absorber from a compression volume of the FL shock absorber, (ii) the first valve block decoupling a rebound volume of the FR shock absorber from a compression volume of the FR shock absorber, (iii) the second valve block decoupling a rebound volume of the RR shock absorber from a compression volume of the RR shock absorber, and (iv) the second valve block decoupling a rebound volume of the RL shock absorber from a compression volume of the RL shock absorber.

In some embodiments, a suspension mode includes (i) the first valve block coupling a rebound volume of the FL shock absorber to a compression volume of the FL shock absorber, (ii) the first valve block coupling a rebound volume of the FR shock absorber to a compression volume of the FR shock absorber, (iii) the second valve block coupling a rebound volume of the RR shock absorber to a compression volume of the RR shock absorber, and (iv) the second valve block coupling a rebound volume of the RL shock absorber to a compression volume of the RL shock absorber.

In some embodiments, a suspension mode includes (i) the first valve block coupling a rebound volume of the FR shock absorber to a compression volume of the FL shock absorber, (ii) the first valve block coupling a rebound volume of the FL shock absorber to a compression volume of the FR shock absorber, (iii) the second valve block coupling a rebound volume of the RR shock absorber to a compression volume of the RL shock absorber, and (iv) the second valve block coupling a rebound volume of the RL shock absorber to a compression volume of the RR shock absorber.

In some embodiments, a suspension mode includes (i) the first valve block coupling a rebound volume of the FL shock absorber to a compression volume of the FL shock absorber by a first controllable flow damper, (ii) the first valve block coupling a rebound volume of the FR shock absorber to a compression volume of the FR shock absorber by a second controllable flow damper, (iii) the second valve block coupling a rebound volume of the RR shock absorber to a compression volume of the RR shock absorber by a third controllable flow damper, and (iv) the second valve block coupling a rebound volume of the RL shock absorber to a compression volume of the RL shock absorber by a fourth controllable flow damper.

In some embodiments, the present disclosure is directed to a method for managing a suspension system of a vehicle. The method includes determining a suspension mode for the vehicle, transmitting a first control signal for achieving the suspension mode to a first control valve fluidly coupled to a first shock absorber, a second shock absorber, a third shock absorber, and a fourth shock absorber, transmitting a second control signal for achieving the suspension mode to a second control valve fluidly coupled to the first shock absorber, the second shock, the third shock absorber, and the fourth shock absorber. In some embodiments, determining the suspension mode for the vehicle includes selecting the suspension mode from among a plurality of suspension modes.

In some embodiments, the plurality of suspension modes includes a mode wherein the first control signal and the second control signal cause increased roll stiffness and pitch stiffness, while maintain lesser bounce stiffness and warp stiffness. In some embodiments, the plurality of suspension modes includes a mode wherein the first control signal and the second control signal cause increased pitch stiffness, while maintaining lesser roll stiffness, bounce stiffness, and warp stiffness. In some embodiments, the plurality of suspension modes includes a mode wherein the first control signal and the second control signal cause lesser pitch stiffness, roll stiffness, bounce stiffness, and warp stiffness. In some embodiments, the plurality of suspension modes includes a mode wherein the first control signal and the second control signal cause increased roll stiffness, while maintain lesser pitch stiffness, bounce stiffness, and warp stiffness, and wherein the first control signal and the second control signal cause variable pitch damping.

In some embodiments, the method includes receiving an indication to change suspension modes, and selecting the suspension mode from among a plurality of suspension modes is based at least in part on the indication.

In some embodiments, the method includes receiving one or more sensor signals from one or more sensors configured to sense suspension behavior, and determining the suspension mode is based at least in part on the one or more sensor signals.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to a configurable interconnected suspension system. It would be desired for a vehicle shock absorber to require low service cost, have low weight, be packageable and deliver good vehicle performance in a variety of suspension architectures. For example, the configurable interconnected suspension system may, in some embodiments, include aspects such as location of the hydraulic lines, a hollow rod design, location of damping valves, double-acting cylinder design as a single-rod or double-rod variant, and system architecture. In a further example, double-acting hydraulic cylinders can deliver advantages in interconnected arrangements aimed at vehicle roll stabilization and other performance aspects.

Figure 1:
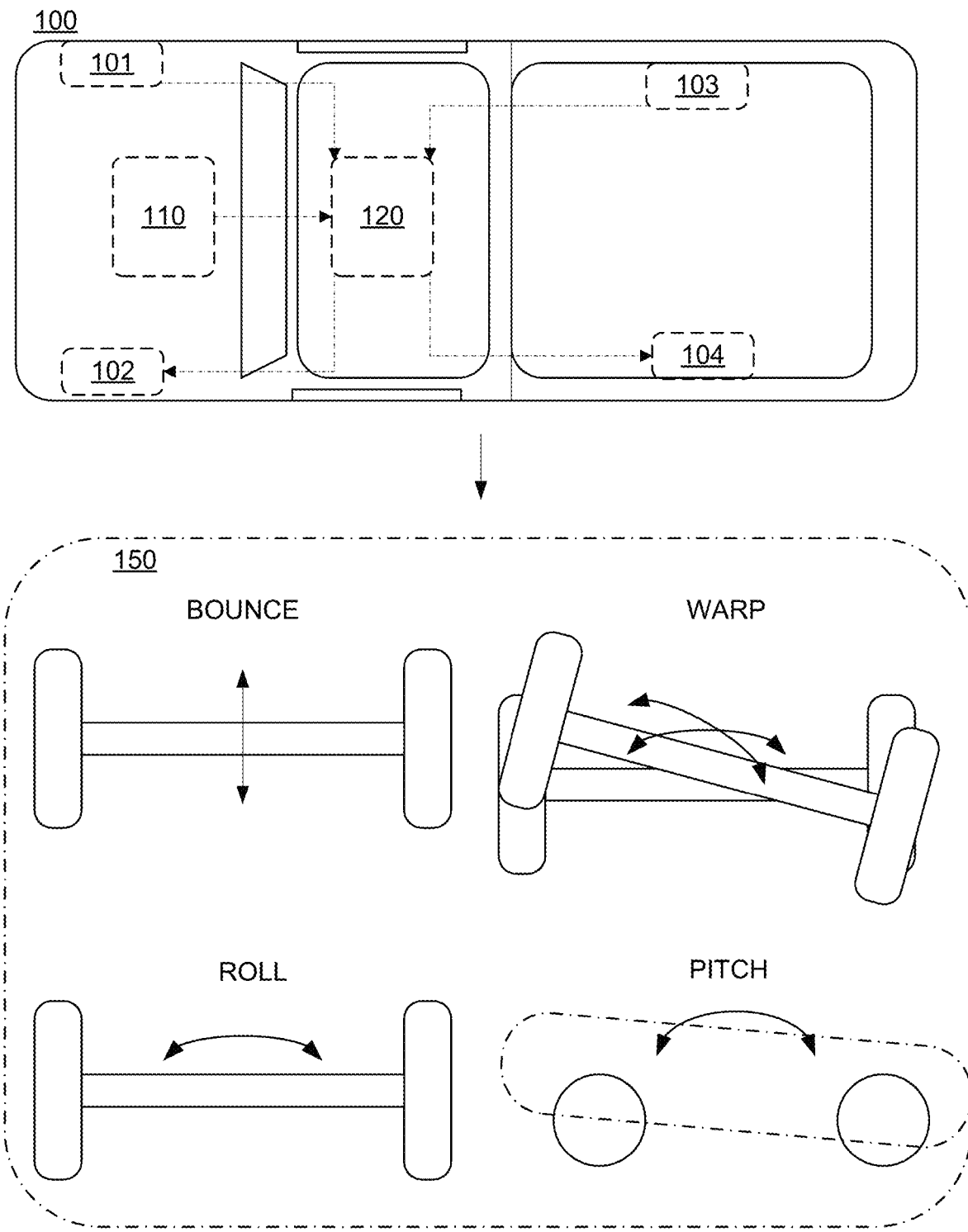
FIG. 1 shows a top view of an illustrative vehicle having a suspension system, in accordance with some embodiments of the present disclosure.

FIG. 1 shows a top view of illustrative vehicle 100 having a suspension system, in accordance with some embodiments of the present disclosure. As illustrated, vehicle 100 includes four wheels, each having corresponding suspensions components (shown collectively as components 101-104 for each respective wheel). The suspension components may include springs, struts, hydraulic cylinders, accumulators, control arms (e.g., wishbones), fittings, valves (e.g., control valves, restriction valves, directional valves, or any other suitable valves), fluid conduits, any other suitable components, or any combination thereof. In some embodiments, any or all of components 101, 102, 103, and 104 may include a double-acting hydraulic cylinder, which may be synchronous or non-synchronous. Fluid management module 120 is configured to control fluid flow, pressure, or both among components 101-104 to affect suspension performance of vehicle 100. Fluid management module 120 may include, for example, fittings, valves (e.g., control valves, restriction valves, directional valves, or any other suitable valves), accumulators, fluid conduits, control valves (e.g., having controllable actuators), valve blocks (e.g., collections of more than one valve or flow paths), control circuitry (e.g., for processing control signals, generating control signals for valves, receiving sensor signals, or a combination thereof), any other suitable components, or any combination thereof. Control system 110 is configured to manage, monitor, or otherwise control the suspension performance of vehicle 100. In some embodiments, control system 110 is included as part of a central vehicle processing unit. In some embodiments, control system 110 is a separate module communicatively coupled to other processing equipment or controllers (e.g., to control circuitry of fluid management module 120).

In an illustrative example, a vehicle (e.g., vehicle 100) may include a suspension controller (e.g., control system 110) coupled to one or more control valves (e.g., of fluid management module 120) to control stiffness or other aspects of components 101-104. In some embodiments, for example, components 101-104 each include a double-acting hydraulic cylinder. The double-acting hydraulic cylinders may be coupled by fluid conduits to each other and to fluid management module 120. For example, the compression volumes and rebound volumes of each double-acting hydraulic cylinder may be coupled in any suitable arrangement to each other and/or to components of fluid management module 120. To illustrate, fluid management module 120 may include control valves each having two or more ports (e.g., at least one inlet port and at least one outlet port) that are configured to control the flow of hydraulic fluid among components 101-104. Panel 150 shows illustrations of vehicle motion modes including bounce (e.g., body moves up/down relative to both wheel axes together), warp (e.g., vehicle exhibits differing side-side rotation among wheel axes), roll (e.g., vehicle exhibits same side-side rotation for both wheel axes), and pitch (e.g., vehicle exhibits differing bounce motion among wheel axes), which may be achieved by vehicle 100 (e.g., based on motion of front and rear wheel axes).

The term "coupled" as used herein in for flow components (e.g., valves, valve assemblies, valve blocks, accumulators, hydraulic cylinders, and hydraulic conduits) refers to "fluidly coupled" wherein the coupled components are in fluid communication via a fluid that may flow dependent upon pressure differences (e.g., caused by changes in volume), flow path, open area (e.g., of a valve), valve state (e.g., open/close, on/off), or a combination thereof. For example, one or more components may be arranged between or otherwise intermediate to fluid components that are coupled (e.g., coupling may include a direct or indirect fluid connection). To illustrate, a hydraulic cylinder and a control valve may be coupled, with one or more damping valves arranged in the flow path between the hydraulic cylinder and the control valve. A "fluid path" (or "flow path") refers to the trajectory along which a fluid flows (e.g., from one component to the next component, or among a series of components), which may include one or more streams (e.g., parallel or otherwise separate paths). For example, a fluid path can branch (e.g., a stream of fluid separating into two or more parallel streams) or combine (e.g., streams of fluid converging together into a single stream), and may pass through one or more components (e.g., flow through devices such as flow valves or "dampers"), terminate at one or more components (e.g., in a dead-end such as a hydraulic cylinder or accumulator), or a combination thereof (e.g., fill and relieve an accumulator arranged along a fluid path (e.g., defined by a fluid conduit, fittings, or a combination or connections thereof).

Figure 2:
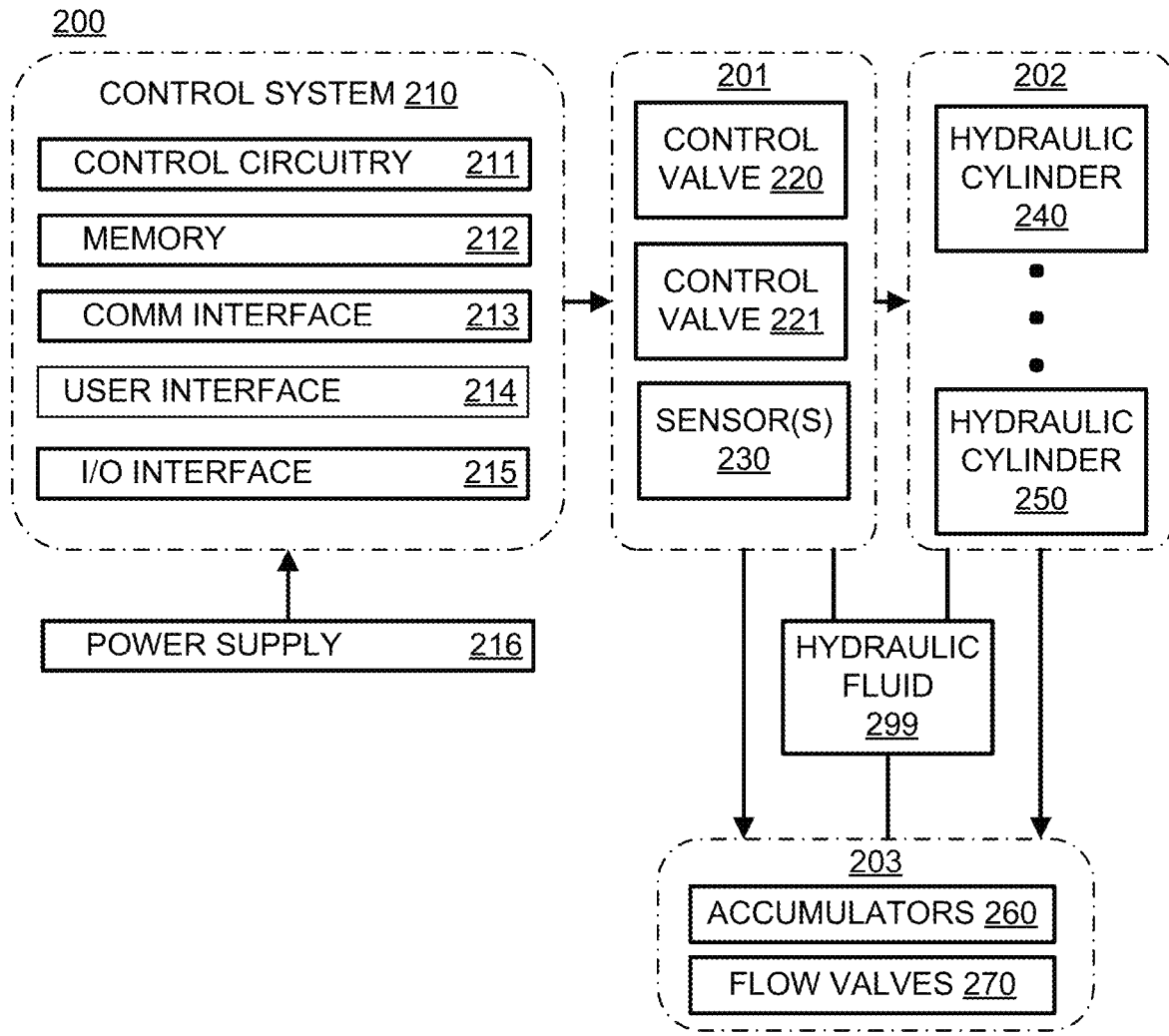
FIG. 2 shows a block diagram of an illustrative control system for controlling a suspension system of a vehicle, in accordance with some embodiments of the present disclosure.

FIG. 2 shows a block diagram of illustrative control system 210 for controlling a suspension system of vehicle 200, in accordance with some embodiments of the present disclosure. To illustrate, vehicle 200 includes components that are not illustrated in FIG. 2. To illustrate further, vehicle 200 may be, but need not be, the same as vehicle 100 of FIG. 1. As illustrated, vehicle 200 includes control system 210, fluid system 201, hydraulic cylinders 202 (e.g., of which hydraulic cylinder 240 is one, and hydraulic cylinder 250 is one), and fluid components 203. As illustrated, control system 210 includes control circuitry 211, memory 212, communications interface 213 (COMM), user input interface 214, and input/output interface 215 (I/O). Illustrative control circuitry 211 may include one or more processors, one or more relays, a communications bus, memory, any other suitable components, or any combination thereof. Hydraulic fluid 299, or any other suitable fluid, is stored in, and flows among, fluid system 201, hydraulic cylinders 202, and fluid components 203.

Control system 210 may include hardware, software, or both, implemented on one or more modules configured to provide control of a suspension system (e.g., fluid system 201, hydraulic cylinders 202, and fluid components 203). In some embodiments, control circuitry 211 includes one or more processors, which may include one or more microprocessors, microcontrollers, digital signal processors, programmable logic devices, field-programmable gate arrays (FPGAs), application-specific integrated circuits (ASICs), or any suitable combination thereof. In some embodiments, control circuitry 211 includes a processor that is distributed across more than one processor or processing units. In some embodiments, control circuitry 211 executes instructions stored in memory 212 (e.g., non-transitory computer readable memory) for managing a suspension system (e.g., fluid system 201, hydraulic cylinders 202, and fluid components 203) of a vehicle (e.g., vehicle 210). In some embodiments, memory 212 is an electronic storage device that is part of control circuitry 211. For example, memory 212 may be configured to store electronic data, computer instructions, applications, firmware, or any other suitable information. In some embodiments, memory 212 includes random-access memory, read-only memory, hard drives, optical drives, solid state devices, or any other suitable memory storage devices, or any combination thereof. For example, memory 212 may be used to launch a start-up routine.

In some embodiments, control system 210 is powered by power supply 216. For example, power may be provided directly or indirectly from power supply 216 to components of fluid system 201 and fluid components 203 (e.g., via control signals, or electric power leads of a relay controlled by control signals). In some embodiments, power supply 216 includes a car battery (e.g., a 12 V lead acid battery, a Li-ion battery, a battery pack of an electric vehicle, or any other suitable battery), a DC-DC converter, an AC power supply (e.g., generated by suitably inverting a DC power supply), any other power supply, any corresponding components (e.g., terminals, switches, fuses, and cables), or any combination thereof.

Communications interface 213 (COMM) is configured to send and receive communications signals from other devices, other controllers, or a combination thereof. In some embodiments, COMM 213 may include one or more antennas, signal processors, ports, plugs, connectors, cables, wires, input/output (I/O) terminals, a printed circuit board, control circuitry, any other suitable components, or any combination thereof. In some embodiments, COMM 213 is configured to receive signals from a smart phone, laptop, tablet, computer, key fob, any other suitable mobile or user device, or any combination thereof.

In some embodiments, user interface 214 includes a push button, a toggle switch, a turnable knob, a display screen (e.g., a touch screen), a key fob, a key-lock combination, a user device (e.g., via COMM 213), any other suitable system or component for receiving input from a user or providing output to a user, or any combination thereof. In some embodiments, user interface 214 includes a touchscreen on the dash of a vehicle, configured to receive input from the user (e.g., to soft buttons or other selectable or adjustable icons or images on a display), and provide a display to the user. In some embodiments, user interface 214 includes one or more buttons that are selectable by a user. For example, the one or more buttons may include a button coupled to a switch, a button on a touchpad, any other suitable button that may be used by a user to make a selection, or any combination thereof. In some embodiments, user interface 214 includes one or more turnable knobs that a user may turn to adjust a suspension system setting and/or mode. In some embodiments, one or more soft buttons (e.g., of a touchscreen) may correspond to a particular function associated with the vehicle, the suspension, or both. For example, a user may interact with user interface 214 to select a suspension mode, control a controllable valve, or otherwise manage suspension system behavior.

In some embodiments, I/O 214 includes a signal generator, signal processor, output terminals, input terminals, any other suitable components, or any combination thereof. For example, I/O 214 may include an amplifier, filter (e.g., digital or analog), power conditioning circuitry (e.g., bypass capacitors or other circuitry), electrical terminals (e.g., for digital signals, analog signals, or both), power terminals (e.g., ground, 3.3V, 5V, 12V, other voltage), any other suitable components, or any combination thereof.

Fluid system 201 may include one or more control valves (e.g., control valves 220 and 221), valve blocks, sensors (e.g., sensors 230), fluid conduits, fittings, any other suitable components, or any combination thereof. In some embodiments, as illustrated, fluid system 201 includes two control valves 220 and 221, which may each include ports and selectable connections among the ports. For example, each of control valves may be configured to achieve one or more positions or configurations, connecting each port to another port or blocking each port. In some embodiments, fluid system 201 may include a plurality of control valves, which may be optionally arranged in one or more valve blocks.

Control valves 220 and 221 may include gate valves, needle valves, metering valves, solenoid valves, butterfly valves, globe valves, ball valves, any other suitable type of valve for controlling flow of a hydraulic fluid, or any combination thereof. In some embodiments, control valves 220 and 221, sensors 230, or a combination thereof are communicatively coupled to control system 210 (e.g., via COMM 213 or I/O interface 215). In some embodiments, fluid system 201 may include control circuitry for controlling control valves 220 and 221, and/or receiving sensor signals from sensors 230. In some embodiments, control valves 220 and 221 each include one or more pressure relief valves each having a respective cracking pressure. For example, the pressure relieve valves may be, but need not be, actively controlled. In a further example, the cracking pressure of the pressure relief valves may be selected (e.g., during design or prior to installation, by selecting a spring), or adjusted (e.g., by control system 210), to achieve a resultant pitch force or other suspension behavior.

In some embodiments, sensor(s) 230 include one or more temperature sensors (e.g., a thermocouple, thermistor, resistance temperature detector, or optical sensor), pressure sensors (e.g., piezo or strain-based transducers), position sensors (e.g., an encoder for valve position or hydraulic cylinder position), flow sensors, any other suitable sensors, or any combination thereof. For example, sensor(s) 230 may be used to measure valve position (e.g., of a control valve), pressure of hydraulic fluid 299 (e.g., in a cylinder, accumulator, conduit, or other component), hydraulic cylinder position (e.g., axial displacement), flow rate of hydraulic fluid 299, or any other suitable value. In a further example, sensor(s) 230 may be used to measure pressure or a difference in pressure of hydraulic fluid 299 (e.g., such as a pressure drop across a valve or other component).

Fluid components 203 are configured to affect hydraulic fluid properties and behavior of the suspension system. As illustrated, fluid components 203 include one or more accumulators 260 and one or more flow valves 270. It will be understood that fluid components 203 may include additional components, be integrated into fluid system 201, or otherwise be modified from that illustrated in FIG. 2, in accordance with the present disclosure. Accumulators 260 are configured to store hydraulic fluid 299 at a predetermined or otherwise limited pressure. For example, accumulators 260 may include bladders, pistons, springs, seals, or other components to exert a known pressure (e.g., which may depend on displacement or may be controlled) on hydraulic fluid 299 in the suspension system, thus allowing expansion and contraction of the working fluid volume (e.g., in hydraulic cylinders 202). To illustrate, each of accumulators 260 may include a sealed volume of gas (e.g., air or nitrogen) separated from the hydraulic fluid 299 by a piston, seal, or diaphragm, and undergo compression and expansion based on the pressure of hydraulic fluid 299 in the respective accumulator. Flow valves 270 may include flow restrictions, which may be fixed, adjustable or controllable. For example, each of flow valves 270 may include a throttle, orifice, or other suitable narrowed passage imparting resistance to flow of hydraulic fluid 299. In some examples, any or all of the fluid system 201 and/or any or all of fluid components 203 may be integrated or attached to hydraulic cylinders 202. For example, any of control valves 220 or 221 may be integrated with, or otherwise attached to, any suitable hydraulic cylinder of hydraulic cylinders 202. In a further example, any of flow valves 270, accumulators 260, and control valves 220 and 221 may be integrated with, or otherwise attached to, any suitable hydraulic cylinder of hydraulic cylinders 202.

Figure 3:
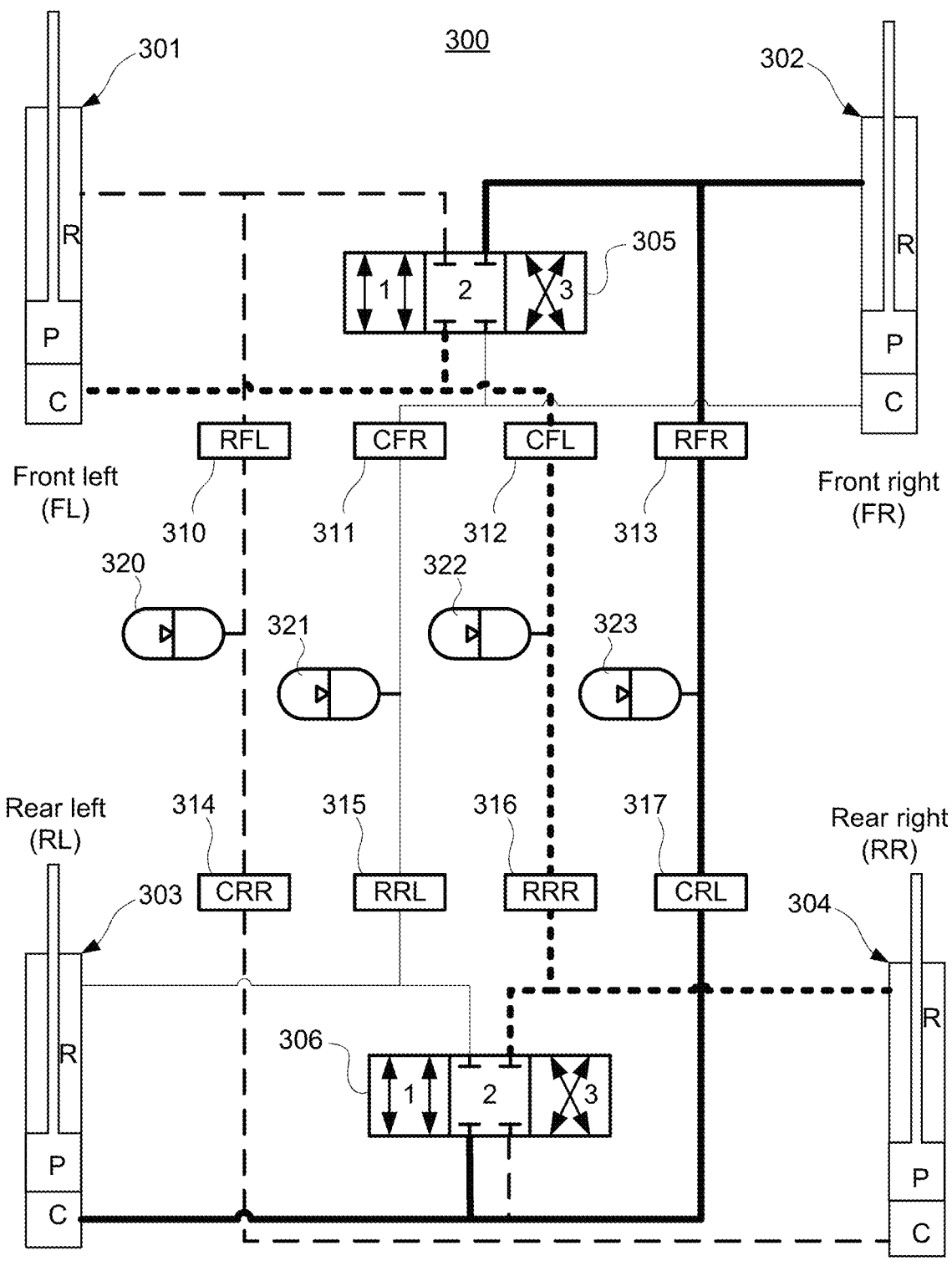
FIG. 3 shows a block diagram of an illustrative vehicle suspension system, in accordance with some embodiments of the present disclosure.

FIG. 3 shows a block diagram of illustrative vehicle suspension system 300 (referred to herein as system 300), in accordance with some embodiments of the present disclosure. As illustrated, system 300 includes shock absorbers 301-304, control valves 305 and 306, flow valves 310-317, and accumulators 320-323, along with any suitable fluid conduits and fittings to make the fluid connections. Each of shock absorbers 301, 302, 303, and 304 includes a double-acting hydraulic cylinder, which may be synchronous or non-synchronous. Regarding flow valves 310-317 (e.g., which may also be referred to as flow dampers or damping valves), the first letter in the designation refers to "rebound" or "compression" while the second letter refers to the "front" or "rear" and the third letter refers to "right" or "left" (e.g., "RFL" refers to the front-left rebound volume). System 300 is an example of a functional representation, as each of control valves 305 and 306 may be realized or otherwise implemented using other valve configurations (e.g., see FIG. 4, or any other suitable arrangement).

Each of shock absorbers 301-304 corresponds to a respective wheel of the vehicle (e.g., front and rear, right and left). For example, each of shock absorbers 301-304 may be coupled (e.g., mechanically coupled) to a respective suspension linkage (e.g., control arms, a frame element, a Macpherson linkage, trailing arm linkage, or other suitable linkage) which affects displacement and dynamics of the corresponding wheel. Each of shock absorbers 301-304 includes a rebound volume (indicated by "R" in FIG. 3) and a compression volume (indicated by "C" in FIG. 3), arranged on either side of a piston (indicated by "P" in FIG. 3). To the extent that any of shock absorbers 301-304 are synchronous, then the change in fluid volume (e.g., of hydraulic fluid 299 of FIG. 2) in the rebound and compression volumes are equal and opposite for movement of the piston. To the extent that any of shock absorbers 301-304 are non-synchronous, then the change in fluid volume in the rebound and compression volumes are opposite but not equal for movement of the piston. For example, as illustrated in FIG. 3, as a piston moves downwards the compression volume becomes smaller while the rebound volume becomes larger. Flow valves 310-317 are coupled to each rebound or compression volume, and restrict flow of hydraulic fluid in one or more directions. For example, as illustrated, rebound flow valves 310, 313, 315, and 316 restrict flow of hydraulic fluid to and from rebound volumes, while compression flow valves 311, 312, 314, and 317 restrict flow of hydraulic fluid to and from compression volumes. In some embodiments, each of flow valves 310-317 may restrict flow in only a single direction, restrict flow in both directions, include two separate flow valves each corresponding to a direction, or any combination thereof. In some embodiments, flow valves 310-317 may be integrated into other components (e.g., into corresponding shock absorbers 301-304), omitted, or otherwise arranged in locations differing from those shown in FIG. 3. Accumulators 320-323, as illustrated, are gas charged and thus can store varying amounts of hydraulic fluid based on pressure. For example, as the gas is compressed or expanded, the pressure exerted on the hydraulic fluid by the gas changes. In some embodiments, accumulators 320-323 may include springs (e.g., in addition to or instead of the gas) to provide stiffness against displacement (e.g., fluid accumulation). In some embodiments, the response of accumulators 320-323 may be controlled or otherwise modified during operation (e.g., by adjusting the mass of trapped gas, or adjusting a spring constant).

Each of control valves 305 and 306 are illustrated as having three positions, indicated as "1" and "2" and "3" in FIG. 3. Table 1 illustrates various suspension system states achieved by controlled the valve positions of control valves 305 and 306. Note that in Table 1, "x" corresponds to relatively lower stiffness, while "•" corresponds to relatively greater stiffness and "x•" corresponds to adjustable stiffness, damping, or both (e.g., using controllable valves with variable position).

TABLE 1

Control Valve positions and suspension system states.

| Mode Stiffened | Position 1:1 | Position 2:2 | Position 2:2* | Position 3:3 |
|---|---|---|---|---|
| Heave | x | x | x | x |
| Pitch | x | • | x• | x |
| Roll | x | • | • | • |
| Warp | x | x | x | x |

As illustrated in Table 1, position 1:1 (e.g., the left position, with straight-through porting in FIG. 3) results in relatively less stiffness to heave (also referred to as "bounce"), pitch, roll, and warp. Position 2:2 (e.g., the center position, with ports deadheaded in FIG. 3) results in pitch and roll stiffness while allowing heave and warp modes to be less stiff. Position 3:3 (e.g., the right position, with crossed porting in FIG. 3) results in roll stiffness while allowing pitch, heave, and warp modes to be less stiff. For example, a vehicle may exhibit relatively low suspension stiffness to warp to allow off-roading (e.g., to maintain traction of all wheels on the ground), and relatively low stiffness to heave for occupant comfort. The suspension system of the vehicle may also allow either (i) pitch, or (ii) pitch and roll, to be stiffened. In some embodiments, control valves 305 and 306 may include a position 2:2* with straight-through porting with adjustable flow restriction (e.g., control valves 305 and 306 may be proportional valves). The position 2:2* allows pitch to be varied (e.g., rather than on-off adjustment) based on terrain conditions, driver preference, predetermined response modes, any other suitable criterion, or a combination thereof. In some embodiments, in position 2:2*, pitch is variably damped using control valves.

In some embodiments, a control system (e.g., control system 110 of FIG. 1 or control system 210 of FIG. 2) selects from among suspension modes that correspond to combinations of desired vehicle motion modes such as, for example, heave, pitch, roll, and warp. In some embodiments, a suspension mode includes high roll and pitch stiffness, with low bounce and warp stiffness (e.g., illustrated by the position 2:2 in Table 1). In some embodiments, a suspension mode includes high roll stiffness, with low pitch, bounce and warp stiffness (e.g., illustrated by the position 3:3 in Table 1). In some embodiments, a suspension mode includes low stiffness in all modes, for increased straight-line driving comfort (e.g., illustrated by the position 1:1 in Table 1). In some embodiments, a suspension mode includes adjustable pitch damping (e.g., using controllable valves) with high roll stiffness with low pitch, bounce and warp stiffness (e.g., illustrated by the position 2:2* in Table 1).

Figure 5:
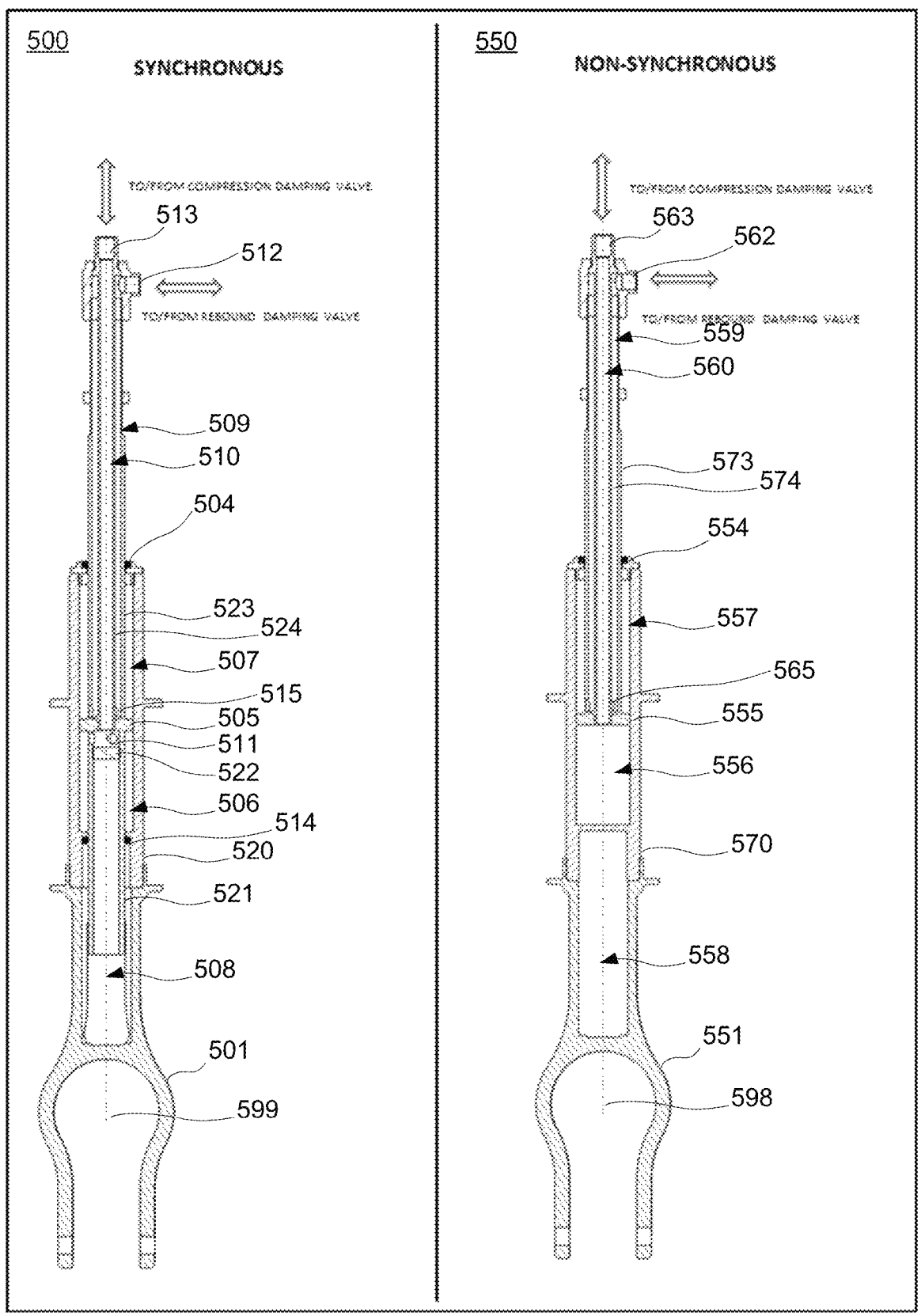
FIG. 5 shows a cross-sectional view of illustrative synchronous and non-synchronous double-acting hydraulic cylinders, in accordance with some embodiments of the present disclosure.

In an illustrative example, a shock absorber assembly having damping valves and ports to the hydraulic chambers located outside the double-acting hydraulic cylinder may decouple maintenance from the double-acting hydraulic cylinder itself, allowing for low service cost (e.g., hydraulic cylinders such as those illustrated in FIG. 5). In some embodiments, the location of the hydraulic fluid lines (e.g., hydraulic conduits) enables a design with high durability, low weight, and packageability with a range of suspension architectures, including integrated assemblies with air or coil springs, interconnected arrangements, or a combination thereof. In some embodiments, the design of the double-acting hydraulic cylinder ensures compatibility with two variants, namely single-rod and double-rod (e.g., synchronous). For example, the single-rod variant may allow reduced package requirements and lower weight, while the double-rod (e.g., synchronous) variant may deliver improved vehicle characteristics, in particular with an interconnected arrangement, due to the lack of vertical spring rate.

In an illustrative example, flow valves 310-317, control valves 305 and 306, accumulators 320-323, or a suitable combination thereof may be integrated with, or otherwise attached to, suitable hydraulic cylinders of hydraulic cylinders 301-304. In a further example, in some embodiments, flow valves 310-317 (e.g., damping valves), accumulators 320-323, or a combination thereof may be integrated with, or otherwise attached to, control valves 305 and 306 (e.g., bypass valves). To illustrate, control valves 305 and 306, and flow valves 310-317 may be controllable by a suitable control system. To illustrate further, control valves 305 and 306 may be integrated with flow valves 310-317, using any suitable porting to achieve suitable flow paths. In a further example, in some embodiments, flow valves 310-317, control valves 305 and 306, accumulators 320-323, and hydraulic cylinders 301-304 are separate components coupled by fluid conduits.

Figure 4:
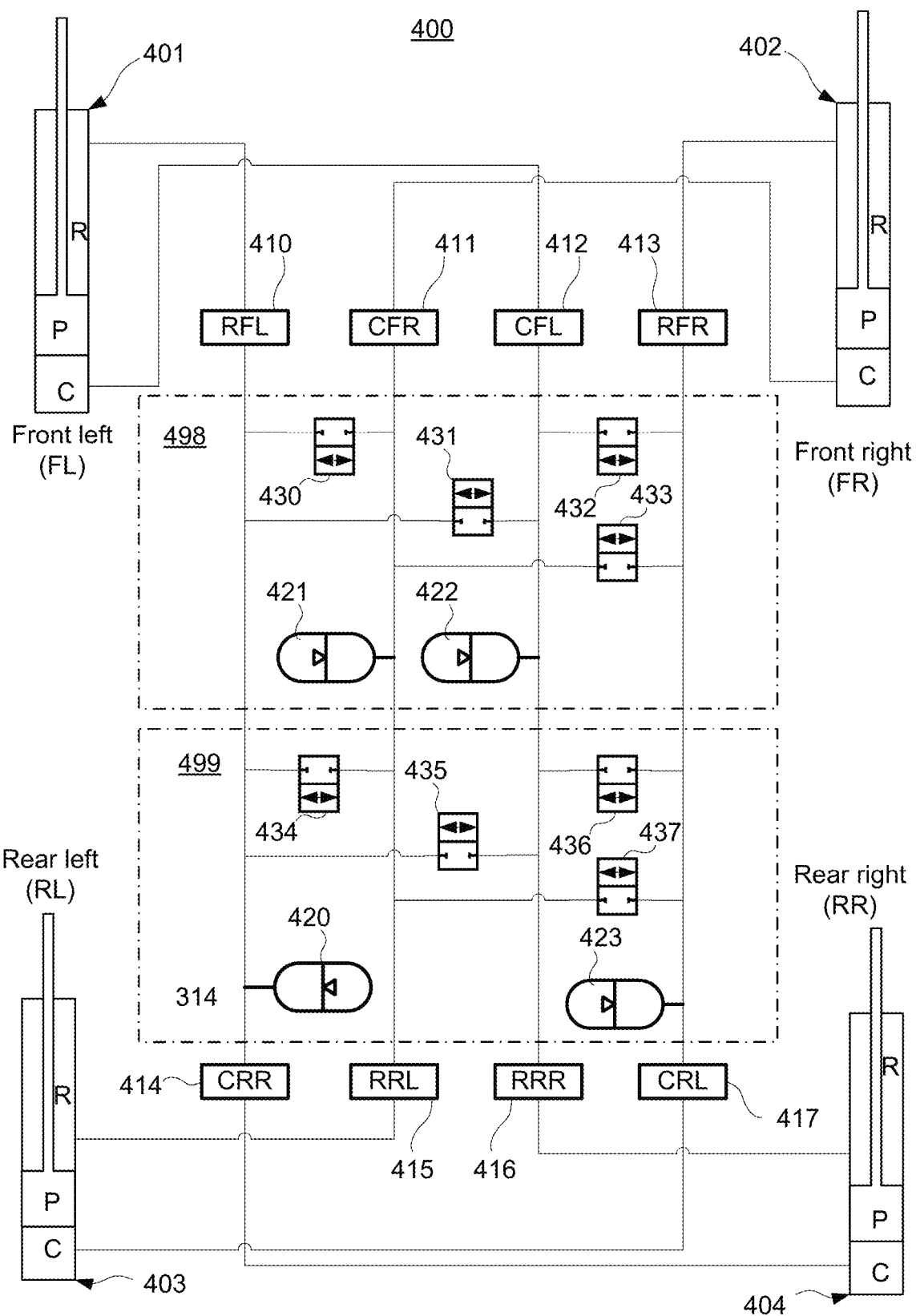
FIG. 4 shows a block diagram of another illustrative vehicle suspension system, in accordance with some embodiments of the present disclosure.

FIG. 4 shows a block diagram of illustrative vehicle suspension system 400, in accordance with some embodiments of the present disclosure. As illustrated, system 400 includes shock absorbers 401-404 (e.g., may be same as shock absorbers 301-304 of FIG. 3), control valves 430-437 (e.g., may be functional equivalent to control valves 305 and 306 of FIG. 6), flow valves 410-417 (e.g., may be same as flow valves 310-317 of FIG. 3 and also be referred to as flow dampers or damping valves), and accumulators 420-423 (e.g., may be same as accumulators 320-323 of FIG. 3), along with any suitable fluid conduits and fittings to make the fluid connections. Each of shock absorbers 401, 402, 403, and 404 includes a double-acting hydraulic cylinder, which may be synchronous or non-synchronous. Regarding flow valves 410-417, the first letter in the designation refers to "rebound" or "compression" while the second letter refers to the "front" or "rear" and the third letter refers to "right" or "left" (e.g., "RFL" refers to the front-left rebound volume). System 400 provides an illustrative example of a plurality of two-position, two-port valves (e.g., control valves 430-437), which may be controlled by a control system (e.g., by receiving control signals at actuators). For example, each of control valves 430-437 may be configured to receive control signals from a control system to achieve one of two positions (e.g., both ports blocked, or both ports connected together). In some embodiments, control valves 430-437 need not be actively controlled, and may include passive control valves such as, for example, pressure relief valves or other suitable valves having characterized operation (e.g., a cracking pressure, damping, loss coefficient, or other suitable property). For example, each of control valves 430-437 may include a pressure relief valve having a spring configured to achieve a cracking pressure. In a further example, each respective spring of control valves 430-437 may be selected to result in a corresponding cracking pressure and corresponding opening/closing dynamics.

Each of shock absorbers 401-404 corresponds to a respective wheel of the vehicle (e.g., front and rear, right and left). For example, each of shock absorbers 401-404 may be coupled to a respective suspension linkage (e.g., control arms, a frame element, a Macpherson linkage, trailing arm linkage, or other suitable linkage) which affects displacement and dynamics of the corresponding wheel. Each of shock absorbers 401-404 includes a rebound volume (indicated by "R" in FIG. 4) and a compression volume (indicated by "C" in FIG. 4), arranged on either side of a piston (indicated by "P" in FIG. 4). To the extent that any of shock absorbers 401-404 are synchronous, then the change in fluid volume in the rebound and compression volumes are equal and opposite for movement of the piston. To the extent that any of shock absorbers 401-404 are non-synchronous, then the change in fluid volume in the rebound and compression volumes are opposite but not equal for movement of the piston. For example, as illustrated in FIG. 4, as a piston moves downwards the compression volume becomes smaller while the rebound volume becomes larger. Flow valves 410-417 are coupled to each rebound or compression volume, and restrict flow of hydraulic fluid in one or more directions. For example, as illustrated, rebound flow valves 410, 413, 415, and 416 restrict flow of hydraulic fluid to and from rebound volumes, while compression flow valves 411, 412, 414, and 417 restrict flow of hydraulic fluid to and from compression volumes. In some embodiments, each of flow valves 410-417 may restrict flow in only a single direction, restrict flow in both directions, include two separate flow valves each corresponding to a direction, or any combination thereof. In some embodiments, flow valves 410-417 may be integrated into other components (e.g., into corresponding shock absorbers 401-404), omitted, or otherwise arranged in locations differing from those shown in FIG. 4. Accumulators 420-423, as illustrated, are gas charged and thus can store varying amounts of hydraulic fluid based on pressure. For example, as the gas is compressed or expanded, the pressure exerted on the hydraulic fluid by the gas changes. In some embodiments, accumulators 420-423 may include springs (e.g., in addition to or instead of the gas) to provide stiffness against displacement (e.g., fluid accumulation). In some embodiments, the response of accumulators 420-423 may be controlled or otherwise modified during operation (e.g., by adjusting the mass of trapped gas, or adjusting a spring constant).

Each of control valves 430-437 are illustrated as having two positions in FIG. 4. Table 2 illustrates various suspension system states achieved by controlled the valve positions of control valves 430-437. As referred to in Table 2, control valves 430 and 434 are "A" valves, control valves 432 and 436 are "B" valves, control valves 431 and 435 are "C" valves, and control valves 433 and 437 are "D" valves. Similar to FIG. 3 and Table 1, valve block 498 (e.g., front valve block) and valve block 499 (e.g., a rear valve block) achieve the same positions in parallel (e.g., the A, B, C, and D valves of each open and/or close together). Note that in Table 2, "x" corresponds to relatively lower stiffness, while "•" corresponds to relatively greater stiffness and "x•" corresponds to adjustable stiffness, damping, or both (e.g., using controllable valves with variable position). Valve blocks 498 and 499 are each a collection of control valves that may be mechanically coupled (e.g., integrated as an assembly), mounted together, or separate control valves that are functionally referred to in the collective as a valve block.

TABLE 2

Control Valve positions and suspension system states.

| Mode | A&B Closed C&D Open | All Closed | Variable | A&B Open C&D Closed |
|---|---|---|---|---|
| Heave | x | x | x | x |
| Pitch | x | ● | x● | x |
| Roll | x | ● | ● | ● |
| Warp | x | x | x | x |

In some embodiments, a system includes a plurality of (e.g., a set of) hydraulic cylinders, each hydraulic cylinder of the plurality of the hydraulic cylinders (e.g., hydraulic cylinders 301-304 of FIG. 3, or hydraulic cylinders 401-404 of FIG. 4) being a double-acting hydraulic cylinder having a compression volume and a rebound volume. In some embodiments, each compression volume of the plurality of hydraulic cylinders is coupled to a rebound volume of another hydraulic cylinder via a respective fluid path, and to first and second control valves. In some embodiments, a system includes a plurality of accumulators arranged along each respective fluid path for storing hydraulic fluid flowing along the respective fluid path (e.g., between compression and rebound volumes).

In some embodiments, as illustrated in FIGS. 3-4, a system includes a valve assembly including a first valve block and a second valve block (e.g., control valves 305 and 306 of FIG. 3, or valve blocks 498 and 499 of FIG. 4). The first valve block (e.g., valve block 305) includes a first port, a second port, a third port and a fourth port. The first port is coupled to a first rebound volume of a first hydraulic cylinder (e.g., hydraulic cylinder 301), the second port is coupled to a second rebound volume of a second hydraulic cylinder (e.g., hydraulic cylinder 302), the third port is coupled to a first compression volume of the first hydraulic cylinder (e.g., hydraulic cylinder 301), and the fourth port is coupled to a second compression volume of the second hydraulic cylinder (e.g., hydraulic cylinder 301). The second valve block (e.g., valve block 306) includes a fifth port, a sixth port, a seventh port and an eighth port. The fifth port is coupled to a third rebound volume of a third hydraulic cylinder (e.g., hydraulic cylinder 303), the sixth port is coupled to a fourth rebound volume of a fourth hydraulic cylinder (e.g., hydraulic cylinder 304), the seventh port is coupled to a fourth compression volume of the fourth hydraulic cylinder (e.g., hydraulic cylinder 304), and the eighth port is coupled to a third compression volume of the third hydraulic cylinder (e.g., hydraulic cylinder 303). In some embodiments, each of the first valve block and the second valve block (e.g., control valves 305 and 306) is configured to achieve a plurality of (e.g., a set of) states corresponding to suspension modes. In a first state (e.g., position 1:1 of Table 1), the first port is coupled to the third port, and the second port is coupled to the fourth port. In the second state (e.g., position 2:2 of Table 1), the first, second, third, and fourth ports are isolated from each other. In a third state (e.g., position 3:3 of Table 1), the first port is coupled to the fourth port, and the second port is coupled to the third port. In some embodiments, as illustrated in FIGS. 3-4, the system includes a plurality of damping valves (e.g., flow valves 310-317 of FIG. 3, or flow valves 410-417 of FIG. 4) coupled to the plurality of hydraulic cylinders, wherein each damping valve is configured to restrict flow in at least one direction. The damping valves may be one-way or two-way damping valves, and optionally a system need not include damping valves (e.g., flow restrictions may be integrated into other components, such as hydraulic cylinders).

In an illustrative example, in some circumstances, when control valves 430, 432, 434, and 436 are closed, the pitch stiffness might not be capable of being controlled independently of the roll stiffness. In some embodiments, system 400 of FIG. 4 may be configured to introduce a saturation on a maximum pitch force provided by the system when control valves 430, 432, 434, and 436 are closed. In some embodiments, system 300 of FIG. 3 may be configured to introduce a saturation on a maximum pitch force provided by the system when control valves 305 and 306 are in position 2:2. In some such embodiments, each control valves may be a pressure relief valve having a respective opening or cracking pressure that may be regulated by an adjustable spring or a selected spring having predetermined properties (e.g., a spring stiffness). To illustrate, the cracking pressure may affect the maximum pitch force of the suspension system. For example, a relatively lesser cracking pressure may correspond to no pitch force or an otherwise low pitch force, which may be equivalent to or otherwise similar to control valves 430, 432, 434, and 436 in a fully-open position. In a further example, a relatively greater cracking pressure may correspond to the greatest or otherwise greater pitch force, which may be equivalent to or otherwise similar to control valves 430, 432, 434, and 436 in a fully-closed position. In some embodiments, the cracking pressure may be adjustable (e.g., mechanically or electronically adjustable), and the relief pressure may be continuously adjusted to adjust the range of maximum pitch forces (e.g., by the user or an automatic control system configured to control aspects of the vehicle suspension system).

In an illustrative example, flow valves 410-417, control valves 430-437, accumulators 420-423, or a suitable combination thereof may be integrated with, or otherwise attached to, suitable hydraulic cylinders of hydraulic cylinders 401-404. In a further example, in some embodiments, flow valves 410-417 (e.g., damping valves), accumulators 420-423, or a combination thereof may be integrated with, or otherwise attached to, control valves 430-437 (e.g., bypass valves). To illustrate, control valves 430-437, and flow valves 410-417 may be controllable by a suitable control system. To illustrate further, control valves 430-437 may be integrated with flow valves 410-417, using any suitable porting to achieve suitable flow paths. In a further example, in some embodiments, flow valves 410-417, control valves 430-437, accumulators 420-423, and hydraulic cylinders 401-404 are separate components coupled by fluid conduits.

FIG. 5 shows a cross-sectional view of illustrative synchronous and non-synchronous double-acting hydraulic cylinders 500 and 550 (referred to herein as hydraulic cylinders 500 and 550), in accordance with some embodiments of the present disclosure. For example, hydraulic cylinders 500 and 550 may incur relatively low service cost, low weight, and good vehicle performance. In a further example, hydraulic cylinders 500 and 550 may allow the same hardware to be used in a variety of suspension architectures (e.g., passive or active damping, interconnected or non-interconnected arrangements), thus improving the modularity of the design across different type of vehicles. Hydraulic cylinder 500 is a synchronous while hydraulic cylinder 550 is non-synchronous.

Hydraulic cylinder 500, as illustrated, includes mount 501, seals 504 and 514, piston 505, compression chamber 506, rebound chamber 507, reservoir 508, volume 509, volume 510, port 511, port 512, port 513, port 515, plug 522, tube 521, tube 523, tube 524, and tube 520. Mount 501 is configured to interface to components of a suspension system of the vehicle such as, for example, a spindle, frame element, control arm, a linkage, any other suitable component, or any combination thereof. Tube 520 affixes to mount 501 to form a first structure (e.g., a first rigid structure). Piston 505, plug 522 (e.g., which seals port 511 from reservoir 508), and tubes 521, 523, and 524 form a second structure (e.g., a second rigid structure), which can move axially along axis 599 relative to the first structure. The second structure is sealed against the first structure by seal 504 (e.g., a slidable seal joint), thus providing a seal for rebound chamber 507. As the second structure moves axially, compression chamber 506 and rebound chamber 507 undergo changes in volume. The change in volume of compression chamber 506 is equal and opposite to the change in volume of rebound cylinder 507 (i.e., hydraulic cylinder 500 is synchronous). To illustrate, as hydraulic cylinder 500 is compressed, compression volume 506 reduces in volume while rebound volume 507 increases in volume. Similarly, as hydraulic cylinder 500 rebounds, compression volume 506 increases in volume while rebound volume 507 decreases in volume. Hydraulic fluid from rebound volume 507 may flow through port 515 into volume 509 (e.g., an annulus arranged between tubes 523 and 524), and though port 512, and also flow through the reverse path, as piston 505 moves axially along axis 599. Hydraulic fluid from compression volume 506 may flow through port 511 into volume 510 (e.g., formed by the interior of tube 524), and though port 513, and also flow through the reverse path, as piston 505 moves axially along axis 599. The hydraulic fluid pressure and flow are affected by components coupled to ports 512 and 513. For example, as illustrated, flow restrictions which provide damping are arranged external to hydraulic cylinder 500 (e.g., coupled to ports 512 and 513 by fluid conduits).

Hydraulic cylinder 550, as illustrated, includes mount 551, seal 554, piston 555, compression chamber 556, rebound chamber 557, reservoir 558, volume 559, volume 560, port 562, port 563, port 565, tube 573, tube 574, and tube 570. Mount 551 is configured to interface to components of a suspension system of the vehicle such as, for example, a spindle, frame element, control arm, a linkage, any other suitable component, or any combination thereof. Tube 570 affixes to mount 551 to form a first structure (e.g., a first rigid structure). Piston 555 and tubes 573 and 574 form a second structure (e.g., a second rigid structure), which can move axially along axis 598 relative to the first structure. The second structure is sealed against the first structure by seal 554 (e.g., a slidable seal joint), thus providing a seal for rebound chamber 557. As the second structure moves axially, compression chamber 556 and rebound chamber 557 undergo changes in volume. The change in volume of compression chamber 556 is opposite in sign to the change in volume of rebound cylinder 557 (i.e., hydraulic cylinder 500 is synchronous), although the magnitude of net volume change is not the same. For example, as illustrated, because compression volume 556 has a relatively large cross-sectional area than rebound volume 557, for a given axial displacement of piston 555 along axis 598, compression volume 556 will exhibit a larger change in accumulated hydraulic fluid than rebound volume 557. To illustrate, as hydraulic cylinder 550 is compressed, compression volume 556 reduces in volume while rebound volume 557 increases in volume. Similarly, as hydraulic cylinder 550 rebounds, compression volume 556 increases in volume while rebound volume 557 decreases in volume. Hydraulic fluid from rebound volume 557 may flow through port 565 into volume 559 (e.g., an annulus arranged between tubes 573 and 574), and though port 562, and also flow through the reverse path, as piston 555 moves axially along axis 598. Hydraulic fluid from compression volume 556 may flow through tube 565 (e.g., which may, but need not, include a flow restriction) into volume 560 (e.g., formed by the interior of tube 574), and though port 563, and also flow through the reverse path, as piston 555 moves axially along axis 598. The hydraulic fluid pressure and flow are affected by components coupled to ports 562 and 563. For example, as illustrated, flow restrictions which provide damping are arranged external to hydraulic cylinder 550 (e.g., coupled to ports 562 and 563 by fluid conduits).

Figure 8:
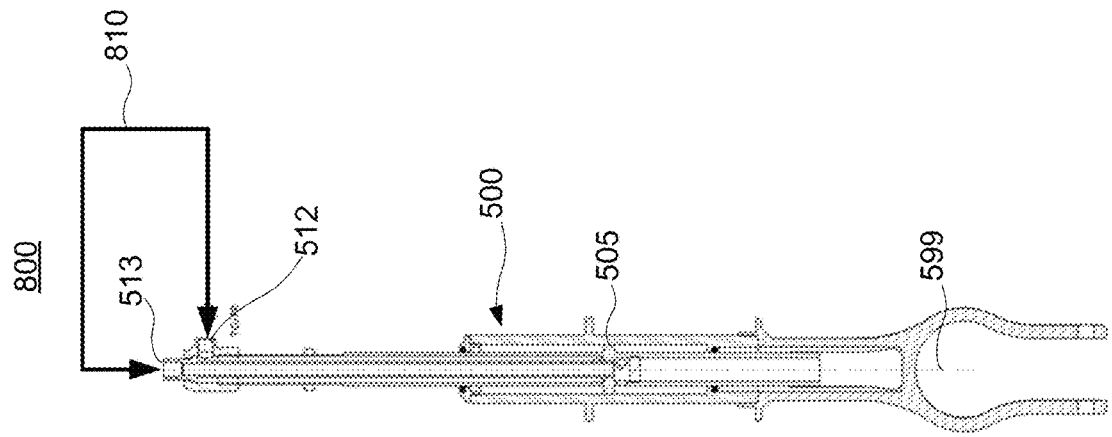
FIG. 8 shows an arrangement having a double-acting hydraulic cylinder with hydraulic coupling, in isolation, in accordance with some embodiments of the present disclosure.
Figure 7:
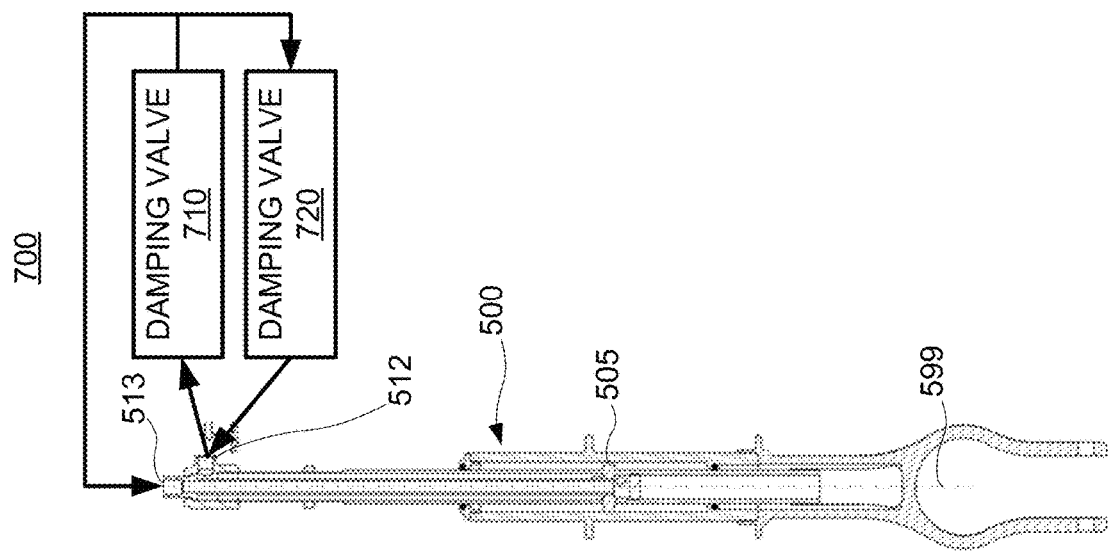
FIG. 7 shows an arrangement having a double-acting hydraulic cylinder and two damping valves, in isolation, in accordance with some embodiments of the present disclosure.
Figure 6:
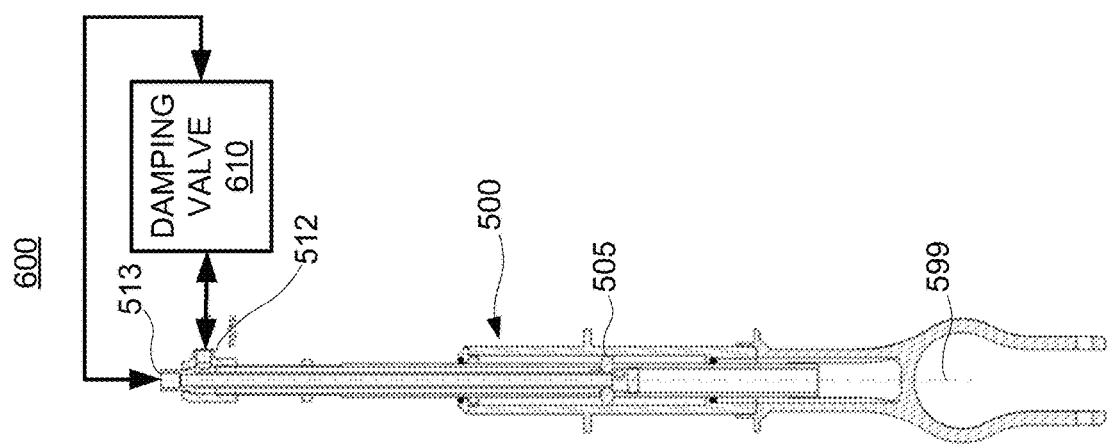
FIG. 6 shows an arrangement having a double-acting hydraulic cylinder and a damping valve, in isolation, in accordance with some embodiments of the present disclosure.
Figure 10:
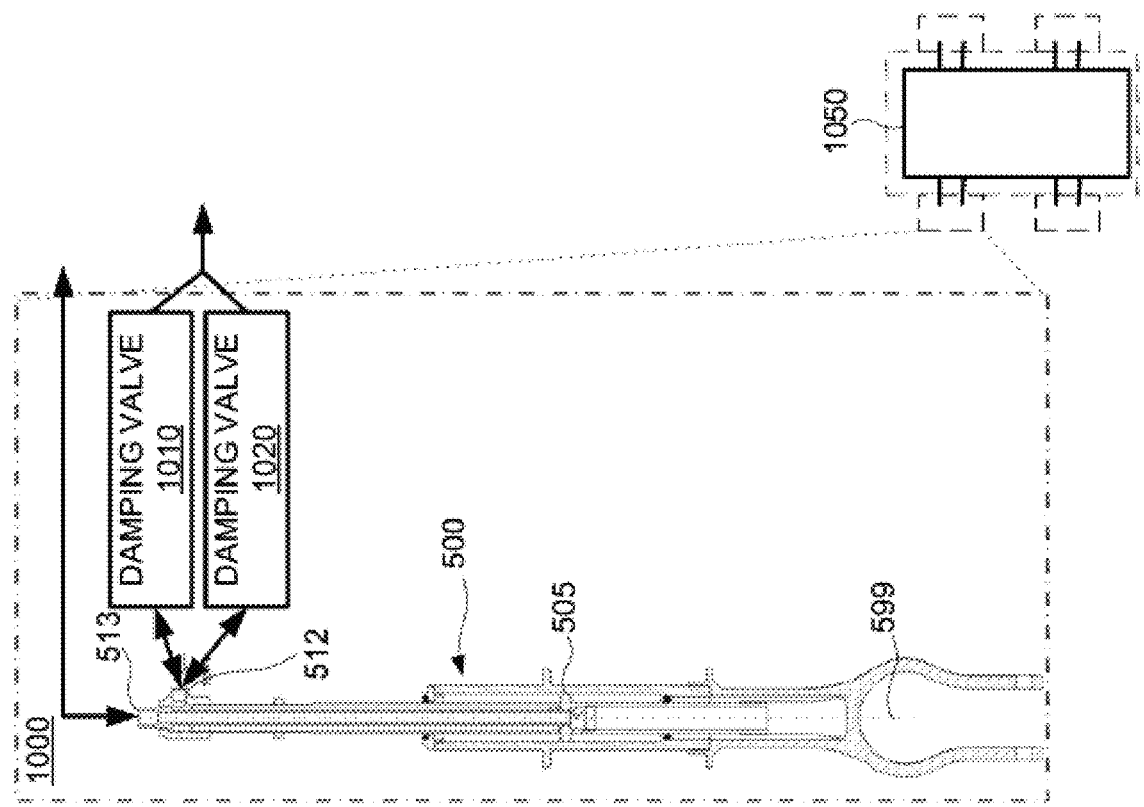
FIG. 10 shows another arrangement having a double-acting hydraulic cylinder interconnected as part of an illustrative suspension system, in accordance with some embodiments of the present disclosure.
Figure 9:
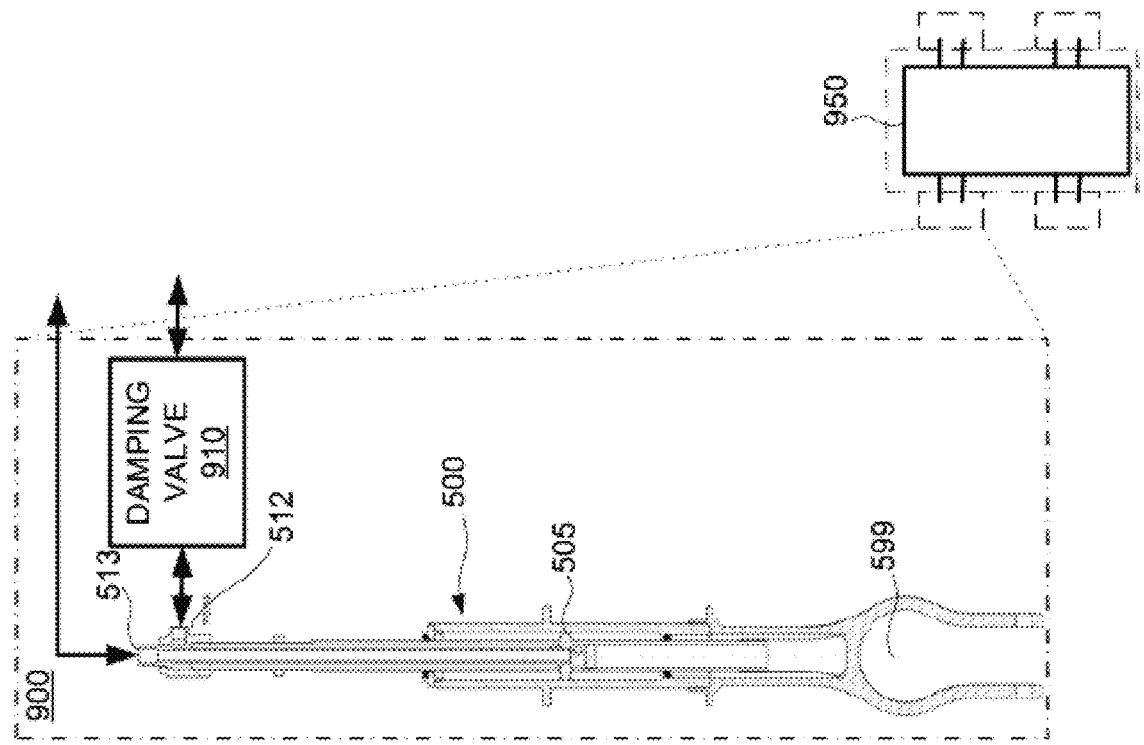
FIG. 9 shows an arrangement having a double-acting hydraulic cylinder interconnected as part of an illustrative suspension system, in accordance with some embodiments of the present disclosure.
Figure 11:
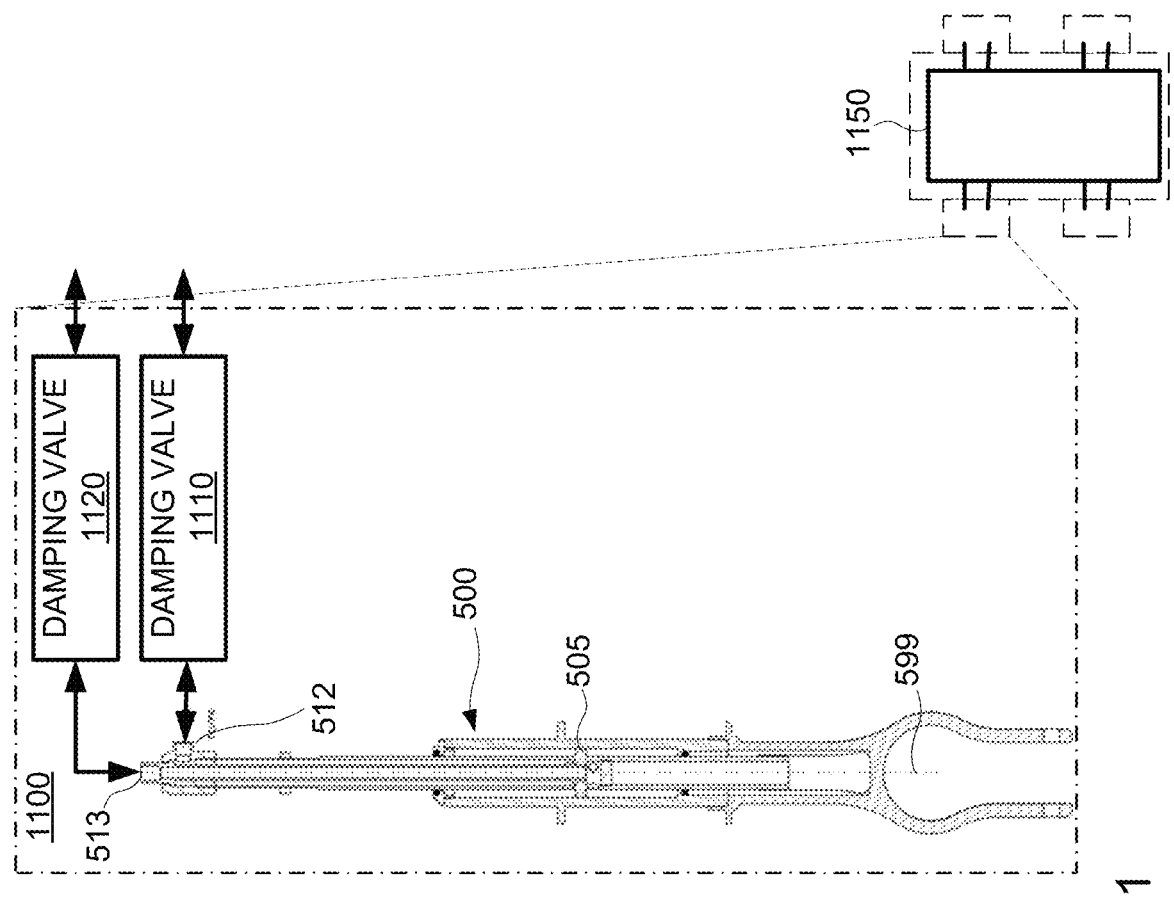
FIG. 11 shows another arrangement having a double-acting hydraulic cylinder interconnected as part of an illustrative suspension system, in accordance with some embodiments of the present disclosure.

FIGS. 6-8 illustrate several illustrative arrangements of a synchronous hydraulic cylinder (e.g., hydraulic cylinder 500 of FIG. 5), providing isolated damping (e.g., not interconnected to other hydraulic cylinders), while FIGS. 9-11 illustrate non-isolated damping (e.g., with interconnection). A vehicle such as vehicle 100 of FIG. 1, or any other suitable suspension system, may include any of the illustrative arrangements of FIGS. 6-11, or any combination thereof, in accordance with the present disclosure. It will be understood that while arrangements 600, 700, 800, 900, 1000, and 1100 are illustrated as including hydraulic cylinder 500, arrangements 600, 700, 800, 900, 1000, and 1100 may include hydraulic cylinder 550 of FIG. 5 (e.g., with an accumulator and/or other components for non-synchronous systems), or any other suitable hydraulic cylinder, in accordance with the present disclosure.

FIG. 6 shows arrangement 600 having double-acting hydraulic cylinder 500 and damping valve 610 (e.g., a flow damper), in isolation, in accordance with some embodiments of the present disclosure. Damping valve 610, as illustrated, is a two-way damping valve, providing restriction to hydraulic flow in either direction (e.g., rebound or compression). For example, as piston 505 moves along axis 599, hydraulic fluid flows through damping valve 610, which provides greater restriction to greater flow of hydraulic fluid. Damping valve 610 may provide the same, similar, or different damping in each direction. For example, damping valve 610 may provide greater or lesser damping to rebound than compression. Because damping valve 610 is external to hydraulic cylinder 500, hydraulic cylinder 500 may be more compact, damping valve 610 may be more easily serviced or replaced, the damping may be adjusted (e.g., by a control system), or a combination thereof.

FIG. 7 shows arrangement 700 having double-acting hydraulic cylinder 500 and two damping valves 710 and 720 (e.g., flow dampers or flow valves), in isolation, in accordance with some embodiments of the present disclosure. Damping valves 710 and 720, as illustrated, are each one-way damping valves, providing a respective restriction to hydraulic flow in a respective direction (e.g., rebound or compression). For example, as piston 505 moves down along axis 599 (e.g., compression), hydraulic fluid flows through damping valve 720, which provides greater restriction to greater flow of hydraulic fluid. Further, as piston 505 moves up along axis 599 (e.g., rebound), hydraulic fluid flows through damping valve 710, which provides greater restriction to greater flow of hydraulic fluid. In some embodiments, damping valves 710 and 720 are, or otherwise function as, check valves allowing flow of hydraulic fluid in only one direction (e.g., as indicated by the arrows in FIG. 7). Damping valves 710 and 720 may provide the same, similar, or different damping as each other. For example, damping valve 710 may provide greater or lesser damping as compared to damping valve 720. Because damping valves 710 and 720 are external to hydraulic cylinder 500, hydraulic cylinder 500 may be more compact, damping valves 710 and 720 may be more easily serviced or replaced, the damping may be adjusted (e.g., by a control system), or a combination thereof. In an illustrative example, damping valves 710 and 720 may correspond to suitable flow valves of flow valves 310-317 of FIG. 3 or flow valves 410-417 of FIG. 4.

FIG. 8 shows arrangement 800 having double-acting hydraulic cylinder 500 with hydraulic coupling 810, in isolation, in accordance with some embodiments of the present disclosure. As illustrated, hydraulic coupling 810 includes fluid conduit that connects ports 512 and 513. Fluid conduit 810 includes a characteristic restriction to flow, that may be the same or different for flow in each direction (e.g., rebound or compression). For example, fluid conduit 810 may include tubing, piping, hosing, fittings, or a combination thereof that have sizes that define a restriction to flow (e.g., a pressure loss as a function of flow), that may, but need not, be more restrictive than ports 512 and 513 or other suitable aspects of hydraulic cylinder 500 (e.g., fluid conduit 810 may, but need not, provide a significant restriction). For example, as piston 505 moves along axis 599 (e.g., compression), hydraulic fluid flows through hydraulic conduit 810 and between the compression volume and rebound volume (e.g., compression volume 506 and rebound volume 507). Because hydraulic conduit 810 is external to hydraulic cylinder 500, hydraulic cylinder 500 may be more compact, addition components may be retrofitted along hydraulic conduit 810, or a combination thereof.

FIG. 9 shows arrangement 900 having a double-acting hydraulic cylinder interconnected as part of an illustrative suspension system, in accordance with some embodiments of the present disclosure. As illustrated, hydraulic cylinder 500 is included in arrangement 900. Damping valve 910, as illustrated, is a two-way damping valve, providing restriction to hydraulic flow in either direction (e.g., rebound or compression). For example, as piston 505 moves along axis 599, hydraulic fluid flows through damping valve 910 to and from hydraulic interconnection network 950. Damping valve 910 may provide the same, similar, or different damping in each direction (e.g., restriction to flow). For example, damping valve 910 may provide greater or lesser damping to rebound than compression. Because damping valve 910 is external to hydraulic cylinder 500, hydraulic cylinder 500 may be more compact, damping valve 910 may be more easily serviced or replaced, the damping may be adjusted (e.g., by a control system), or a combination thereof. To illustrate, arrangement 900 may be included in any suitable hydraulic system arrangement such as, for example, arrangements 300 or 400 of FIGS. 3-4. Hydraulic interconnection network 950 may include any suitable components such as, for example, control valves, damping valves, accumulators, sensors, fluid conduits, fittings, any other suitable components, or any combination thereof.

FIG. 10 shows arrangement 1000 having a double-acting hydraulic cylinder interconnected as part of an illustrative suspension system, in accordance with some embodiments of the present disclosure. Damping valves 1010 and 1020, as illustrated, are each one-way damping valves, providing a respective restriction to hydraulic flow in a respective direction (e.g., rebound or compression), to and from hydraulic interconnection network 1050. For example, as piston 505 moves down along axis 599 (e.g., compression), hydraulic fluid flows through damping valve 1020, which provides greater restriction to greater flow of hydraulic fluid. Further, as piston 505 moves up along axis 599 (e.g., rebound), hydraulic fluid flows through damping valve 1010, which provides greater restriction to greater flow of hydraulic fluid. In some embodiments, damping valves 1010 and 1020 are, or otherwise function as, check valves allowing flow of hydraulic fluid in only one direction (e.g., as indicated by the arrows in FIG. 10). Damping valves 1010 and 1020 may provide the same, similar, or different damping as each other. For example, damping valve 1010 may provide greater or lesser damping as compared to damping valve 1020. Because damping valves 1010 and 1020 are external to hydraulic cylinder 500, hydraulic cylinder 500 may be more compact, damping valves 1010 and 1020 may be more easily serviced or replaced, the damping may be adjusted (e.g., by a control system), or a combination thereof. To illustrate, arrangement 1000 may be included in any suitable hydraulic system arrangement such as, for example, arrangements 300 or 400 of FIGS. 3-4. Hydraulic interconnection network 1050 may include any suitable components such as, for example, control valves, damping valves, accumulators, sensors, fluid conduits, fittings, any other suitable components, or any combination thereof.

FIG. 11 shows arrangement 1100 having a double-acting hydraulic cylinder interconnected as part of an illustrative suspension system, in accordance with some embodiments of the present disclosure. Damping valves 1110 and 1120, as illustrated, are each two-way damping valves, providing a respective restriction to hydraulic flow in each direction (e.g., rebound or compression), to and from hydraulic interconnection network 1150. For example, as piston 505 moves along axis 599 (e.g., compression), hydraulic fluid flows through damping valves 1110 and 1120, which provide greater restriction to greater flow of hydraulic fluid. Damping valves 1110 and 1120 may provide the same, similar, or different damping as each other. For example, damping valve 1110 may provide greater or lesser damping as compared to damping valve 1120. Because damping valves 1110 and 1120 are external to hydraulic cylinder 500, hydraulic cylinder 500 may be more compact, damping valves 1110 and 1120 may be more easily serviced or replaced, the damping may be adjusted (e.g., by a control system), or a combination thereof. To illustrate, arrangement 1100 may be included in any suitable hydraulic system arrangement such as, for example, arrangements 300 or 400 of FIGS. 3-4. Hydraulic interconnection network 1150 may include any suitable components such as, for example, control valves, damping valves, accumulators, sensors, fluid conduits, fittings, any other suitable components, or any combination thereof.

Figure 12:
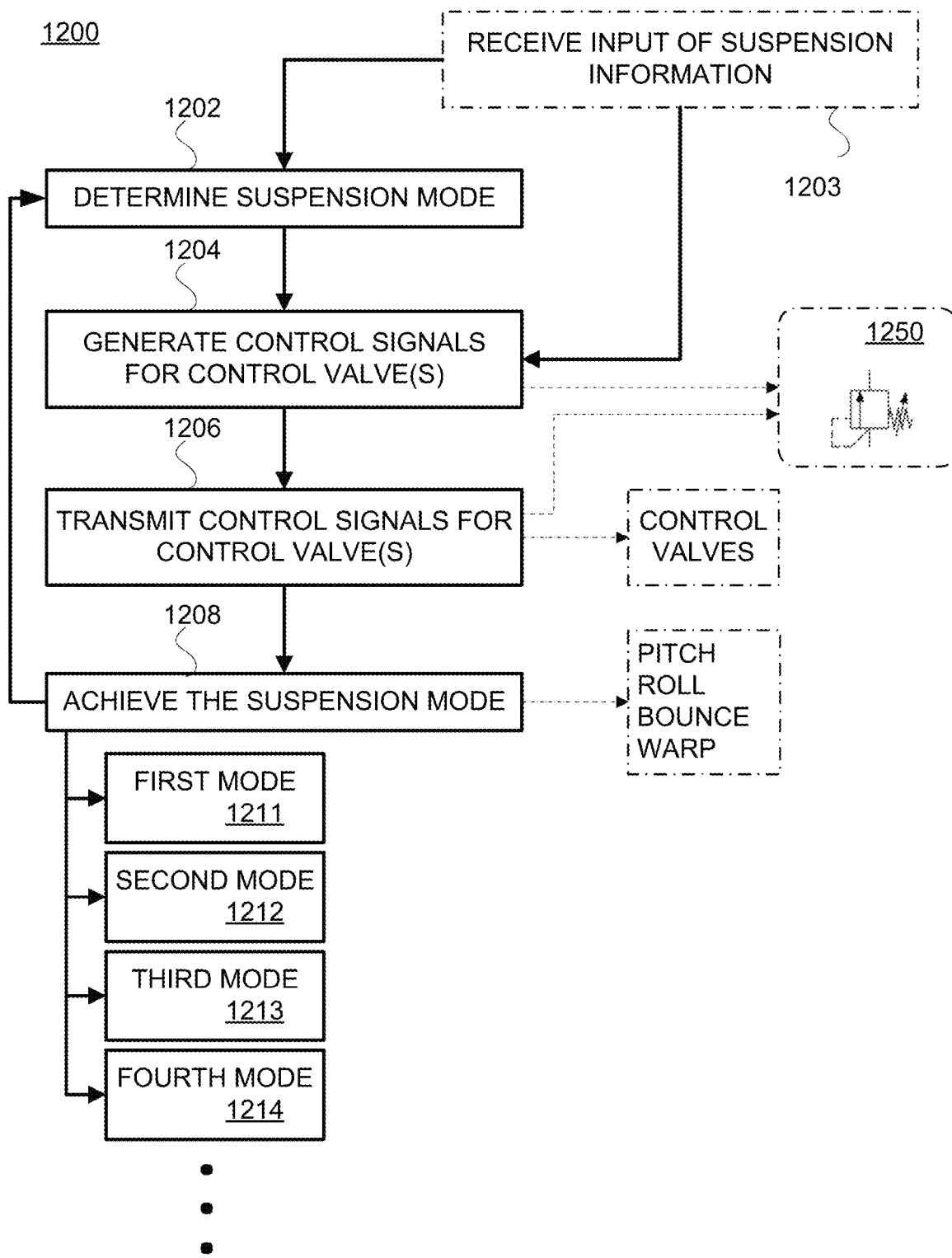
FIG. 12 is a flowchart of an illustrative process for managing a suspension system, in accordance with some embodiments of the present disclosure.

FIG. 12 is a flowchart of illustrative process 1200 for managing a suspension system, in accordance with some embodiments of the present disclosure. For example, the suspension system may include any of the illustrative arrangements of FIGS. 3-4, and 6-11, hydraulic cylinders 500 or 550 of FIG. 5, or any other suitable arrangements, included in a vehicle such as vehicle 100 of FIG. 1 or vehicle 200 of FIG. 2. In some embodiments, instructions for implementing process 1200 for managing a suspension system are stored in memory (e.g., non-transitory computer readable memory such as memory 212) and executed by control circuitry (control circuitry 211).

Step 1202 includes determining a suspension mode. In some embodiments, the system determines the suspension mode at step 1202 based at least in part on input received at step 1203. In some embodiments, determining the suspension mode for the vehicle at step 1202 includes selecting the suspension mode from among a plurality of suspension modes (e.g., as illustrated in Tables 1-2). In some embodiments, the system receives an indication to change suspension modes at step 1203, and the system selects the suspension mode from among a plurality of suspension modes based at least in part on the indication at step 1202. In some embodiments, the system receives one or more sensor signals at step 1203 from one or more sensors configured to sense suspension behavior, and the system may determine the suspension mode at step 1202 based at least in part on the one or more sensor signals. Step 1203 includes receiving input at an input interface. The input may include suspension information, such as user input (e.g., at a user input interface), sensor information (e.g., based on one or more sensor signals), reference information (e.g., retrieved from a database), any other suitable input, or any combination thereof. Step 1202, 1203, or both may be performed at any suitable interval (e.g., a random interval, or at a predetermined frequency), in response to any suitable event, as part of any suitable algorithm or set of executable instructions, or any combination thereof.

Step 1204 includes generating one or more control signals for one or more control valves. In some embodiments, for example, the system may include one or more valves, valve assemblies, valve blocks, or a combination thereof, and the system may generate a respective control signal corresponding to each valve, valve assembly, or valve block. In some embodiments, the system generates the one or more control signals based on the suspension mode of step 1202. In some embodiments, the system includes a signal generator, communications bus, communications interface, or any other suitable components for generating a software signal, electrical signal, optical signal, wireless signal, any other suitable signal, or any combination thereof.

Step 1206 includes transmitting the one or more control signals of step 1204 to the one or more valves, valve blocks, or otherwise actuators for controlling characteristics of the suspension system. In some embodiments, step 1206 includes (i) transmitting (e.g., using control circuitry 211) a first control signal for achieving the suspension mode to a first control valve fluidly coupled to one or more shock absorbers (e.g., four shock absorbers), and (ii) transmitting (e.g., using control circuitry 211) a second control signal for achieving the suspension mode to a second control valve fluidly coupled to one or more shock absorbers (e.g., the four shock absorbers). In some embodiments, the system generates a signal control system that is multiplexed, split, or otherwise transmitted to two or more separate valves, valve assemblies, or valve blocks. The one or more control signals may be transmitted over a cable (e.g., a multiconductor cable), a communications bus, one or more wires, one or more fiber optics, one or more wireless signals (e.g., transmitted and received by antennas), any other suitable communications link, or any combination thereof.

Step 1208 includes achieving the suspension mode of step 1202. Each suspension mode may include adjusting, specifying, or otherwise achieving a stiffness to bounce, pitch, roll, warp, or other motions by controlling the one or more valves and/or valve bodies. Below, steps 1211-1214 are described in the context of FIGS. 3-4 for illustration. Each suspension mode may include prescribed stiffnesses to pitch, roll, bounce, and warp (e.g., each of these vehicle motion modes are illustrated in panel 150).

Step 1211 includes the system achieving, or otherwise operating in, a first mode. In the first mode, (i) the first valve block (e.g., control valve 305 of FIG. 3 or valve block 498 of FIG. 4) decouples a rebound volume of the FL shock absorber from a compression volume of the FL shock absorber, (ii) the first valve block decouples a rebound volume of the FR shock absorber from a compression volume of the FR shock absorber, (iii) the second valve block (e.g., control valve 306 of FIG. 3 or valve block 499 of FIG. 4) decouples a rebound volume of the RR shock absorber from a compression volume of the RR shock absorber, and (iv) the second valve block decouples a rebound volume of the RL shock absorber from a compression volume of the RL shock absorber. To illustrate, in the context of FIGS. 3-4, position 2:2 of Table 1 or the configuration "All Closed" of Table 2 correspond to the first mode. In the first mode, the suspension system achieves greater roll and pitch stiffness, with lesser bounce and warp stiffness.

Step 1212 includes the system achieving, or otherwise operating in, a second mode. In the second mode, (i) the first valve block (e.g., control valve 305 of FIG. 3 or valve block 498 of FIG. 4) couples a rebound volume of the FL shock absorber to a compression volume of the FL shock absorber, (ii) the first valve block couples a rebound volume of the FR shock absorber to a compression volume of the FR shock absorber, (iii) the second valve block (e.g., control valve 306 of FIG. 3 or valve block 499 of FIG. 4) couples a rebound volume of the RR shock absorber to a compression volume of the RR shock absorber, and (iv) the second valve block couples a rebound volume of the RL shock absorber to a compression volume of the RL shock absorber. To illustrate, in the context of FIGS. 3-4, position 1:1 of Table 1 or the configuration "A&B Closed, C&D Open" of Table 2 correspond to the second mode. In the second mode, the suspension system achieves lesser stiffness to pitch, roll, bounce, and warp.

Step 1213 includes the system achieving, or otherwise operating in, a third mode. In the third mode, (i) the first valve block couples a rebound volume of the FR shock absorber to a compression volume of the FL shock absorber, (ii) the first valve block couples a rebound volume of the FL shock absorber to a compression volume of the FR shock absorber, (iii) the second valve block couples a rebound volume of the RR shock absorber to a compression volume of the RL shock absorber, and (iv) the second valve block couples a rebound volume of the RL shock absorber to a compression volume of the RR shock absorber. To illustrate, in the context of FIGS. 3-4, position 3:3 of Table 1 or the configuration "A&B Open, C&D Closed" of Table 2 correspond to the third mode. In the third mode, the suspension system achieves greater roll stiffness, with lesser pitch, bounce, and warp stiffness.

Step 1214 includes the system achieving, or otherwise operating in, a fourth mode. In the fourth mode, (i) the first valve block couples a rebound volume of the FL shock absorber to a compression volume of the FL shock absorber by a first controllable flow damper, (ii) the first valve block couples a rebound volume of the FR shock absorber to a compression volume of the FR shock absorber by a second controllable flow damper, (iii) the second valve block couples a rebound volume of the RR shock absorber to a compression volume of the RR shock absorber by a third controllable flow damper, and (iv) the second valve block couples a rebound volume of the RL shock absorber to a compression volume of the RL shock absorber by a fourth controllable flow damper. To illustrate, in the context of FIGS. 3-4, position 2:2* of Table 1 or the configuration "variable" of Table 2 correspond to the first mode. In the fourth mode, the suspension system achieves adjustable pitch damping with greater roll stiffness, with lesser pitch, bounce, and warp stiffness. In an illustrative example, the controllable flow dampers may correspond to flow valves 310-317 of FIG. 3, or flow valves 410-417 of FIG. 4.

In some embodiments, process 1200 may be implemented by a system configured for providing configurable stiffness and damping characteristics. The system may include a plurality of hydraulic cylinders each corresponding to a respective wheel of a vehicle (e.g., vehicle 100 of FIG. 1), a valve assembly for controlling hydraulic fluid in the plurality of hydraulic cylinders to achieve a plurality of suspension modes affecting bounce, pitch, roll, and warp, and a plurality of accumulators acting as spring elements for storing and releasing the hydraulic fluid as the plurality of hydraulic cylinders compress and rebound. The hydraulic cylinders may include, for example, hydraulic cylinders 202 (e.g., hydraulic cylinder 240 or hydraulic cylinder 250 thereof). The valve assembly may include, for example, fluid system 201 of FIG. 2, control valves 305 and 306, valve blocks 498 and 499 of FIG. 4, any other suitable valving, or any combination thereof. In some embodiments, the system includes a control system (e.g., control system 210 or control circuitry 211 thereof of FIG. 2) coupled to a valve assembly (e.g., fluid system 201 of FIG. 2, control valves 305 and 306 of FIG. 3, or valve blocks 498 and 499 of FIG. 4). The control system may be configured to select a suspension mode from a plurality of suspension modes at step 1202, and transmit a control signal to each valve assembly indicative of the suspension mode at step 1206.

In some embodiments, process 1200 may be implemented by a suspension system of a vehicle. The suspension system includes four shock absorbers, each including a double-acting cylinders (e.g., FR, FL, RR, RL). The suspension system also includes two valve blocks, each coupled to the first, second, third, and fourth shock absorbers. The suspension system also includes four accumulators each coupled to at least one compression volume and at least one rebound volume of the first, second, third, or fourth shock absorbers. The control system may control the valve blocks by generating control signals at step 1204 and transmitting the control signals to the valve blocks at step 1206, to achieve the suspension mode at step 1208.

In an illustrative example, in some embodiments, steps 1204 and 1206 may be combined, omitted, or otherwise modified in accordance with the present disclosure. For example, the suspension system may include a plurality of pressure relief valves (e.g., indicated by pressure release valve (PRV) 1250) rather than, or in addition to, actively controlled valves. In a further example, the pressure relief valves may be adjustable (e.g., mechanically or automatically adjustable). Accordingly, the cracking pressure or other suitable dynamics of the pressure relief valve may be predetermined, selected during design, adjusted actively, or a combination thereof to achieve a suspension behavior or suspension state.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for providing configurable stiffness and damping characteristics, the system comprising:
   a plurality of hydraulic cylinders, each corresponding to a respective wheel of a vehicle;
   a valve assembly for controlling hydraulic fluid in the plurality of hydraulic cylinders to achieve a plurality of suspension modes affecting pitch and roll;
   a plurality of accumulators for storing and releasing the hydraulic fluid as the plurality of hydraulic cylinders compress and rebound; and
   control circuitry coupled to the valve assembly and configured to;
      determine a suspension mode for the vehicle by selecting from among a plurality of suspension modes comprising:
         a first suspension mode wherein a first control signal and a second control signal result in greater roll stiffness and pitch stiffness, and lesser bounce stiffness and warp stiffness,
         a second suspension mode wherein the first control signal and the second control signal result in greater pitch stiffness, and lesser roll stiffness, bounce stiffness, and warp stiffness,
         a third suspension mode wherein the first control signal and the second control signal result in lesser pitch stiffness, roll stiffness, bounce stiffness, and warp stiffness, and
         a fourth suspension mode wherein the first control signal and the second control signal result in lesser pitch stiffness, bounce stiffness, and warp stiffness, greater roll stiffness, and variable pitch damping; and
      transmit the first control signal and the second control signal to the valve assembly to cause the system to operate in the suspension mode.

2. The system of claim 1, wherein:
   each hydraulic cylinder of the plurality of the hydraulic cylinders is a double-acting hydraulic cylinder;
   each hydraulic cylinder comprises a compression volume and a rebound volume; and
   each compression volume of the plurality of hydraulic cylinders is in fluid communication along a respective fluid path with a rebound volume of another hydraulic cylinder, and with the valve assembly.

3. The system of claim 2, wherein a respective accumulator of the plurality of accumulators is arranged along each respective fluid path for storing hydraulic fluid flowing along the respective fluid path.

4. The system of claim 1, wherein:
   the valve assembly comprises a first valve block and a second valve block;
   the first valve block comprises a first port, a second port, a third port and a fourth port;
   the first port is coupled to a first rebound volume of a first hydraulic cylinder of the plurality of hydraulic cylinders;
   the second port is coupled to a second rebound volume of a second hydraulic cylinder of the plurality of hydraulic cylinders;
   the third port is coupled to a first compression volume of the first hydraulic cylinder; and
   the fourth port is coupled to a second compression volume of the second hydraulic cylinder.

5. The system of claim 4, wherein:
   the second valve block comprises a fifth port, a sixth port, a seventh port and an eighth port;
   the fifth port is coupled to a third rebound volume of a third hydraulic cylinder of the plurality of hydraulic cylinders;

the sixth port is coupled to a fourth rebound volume of a fourth hydraulic cylinder of the plurality of hydraulic cylinders;

the seventh port is coupled to a third compression volume of the third hydraulic cylinder; and the eighth port is coupled to a fourth compression volume of the fourth hydraulic cylinder.

6. The system of claim 4, wherein each of the first valve block and the second valve block is configured to achieve:

a first state wherein the first port is coupled to the third port, and the second port is coupled to the fourth port;

a second state wherein the first, second, third, and fourth ports are isolated from each other; and a third state wherein the first port is coupled to the fourth port, and the second port is coupled to the third port.

7. The system of claim 1, wherein each suspension mode of the plurality of suspension modes defines one or more vehicle motion modes affecting the bounce stiffness, the pitch stiffness, the roll stiffness, and the warp stiffness.

8. The system of claim 1, further comprising a plurality of damping valves coupled to the plurality of hydraulic cylinders, wherein each damping valve is configured to restrict flow in at least one direction.

9. The system of claim 1, wherein the first control signal is transmitted to a first control valve of the valve assembly and the second control signal is transmitted to a second control valve of the valve assembly.

10. The system of claim 1, wherein the valve assembly comprises one or more pressure relief valves each comprising a respective cracking pressure.

11. A suspension system comprising:

a first shock absorber (FL) having a double-acting cylinder;

a second shock absorber (FR) having a double-acting cylinder;

a third shock absorber (RL) having a double-acting cylinder;

a fourth shock absorber (RR) having a double-acting cylinder;

a first valve block coupled to the first, second, third, and fourth shock absorbers;

a second valve block coupled to the first, second, third, and fourth shock absorbers;

four accumulators each coupled to at least one compression volume and at least one rebound volume of the first, second, third, or fourth shock absorbers; and control circuitry coupled to the first and second valve blocks and configured to;

determine a suspension mode for a vehicle by selecting from among a plurality of suspension modes comprising:

a first suspension mode wherein a first control signal and a second control signal result in greater roll stiffness and pitch stiffness, and lesser bounce stiffness and warp stiffness, a second suspension mode wherein the first control signal and the second control signal result in greater pitch stiffness, and lesser roll stiffness, bounce stiffness, and warp stiffness, a third suspension mode wherein the first control signal and the second control signal result in lesser pitch stiffness, roll stiffness, bounce stiffness, and warp stiffness, and a fourth suspension mode wherein the first control signal and the second control signal result in lesser pitch stiffness, bounce stiffness, and warp stiffness, greater roll stiffness, and variable pitch damping; and transmit the first control signal and the second control signal to the first and second valve blocks to cause the suspension system to operate in the suspension mode.

12. The suspension system of claim 11, wherein:

each shock absorber comprises a respective compression volume and a respective rebound volume;

the compression volume of the RL shock absorber is coupled to the rebound volume of the FR shock absorber, to a first port of the first valve block, and to a first port of the second valve block;

the compression volume of the RR shock absorber is coupled to the rebound volume of the FL shock absorber, to a second port of the first valve block, and to a second port of the second valve block;

the compression volume of the FR shock absorber is coupled to the rebound volume of the RL shock absorber, to a third port of the first valve block, and to a third port of the second valve block; and the compression volume of the FL shock absorber is coupled to the rebound volume of the RR shock absorber, to a fourth port of the first valve block, and to a fourth port of the second valve block.

13. The suspension system of claim 11, wherein in the first suspension mode:

the first valve block decouples a rebound volume of the FL shock absorber from a compression volume of the FL shock absorber;

the first valve block decouples a rebound volume of the FR shock absorber from a compression volume of the FR shock absorber;

the second valve block decouples a rebound volume of the RR shock absorber from a compression volume of the RR shock absorber; and the second valve block decouples a rebound volume of the RL shock absorber from a compression volume of the RL shock absorber.

14. The suspension system of claim 11, wherein in the second suspension mode:

the first valve block couples a rebound volume of the FL shock absorber to a compression volume of the FL shock absorber;

the first valve block couples a rebound volume of the FR shock absorber to a compression volume of the FR shock absorber;

the second valve block couples a rebound volume of the RR shock absorber to a compression volume of the RR shock absorber; and the second valve block couples a rebound volume of the RL shock absorber to a compression volume of the RL shock absorber.

15. The suspension system of claim 11, wherein in the third suspension mode:

the first valve block couples a rebound volume of the FR shock absorber to a compression volume of the FL shock absorber;

the first valve block couples a rebound volume of the FL shock absorber to a compression volume of the FR shock absorber;

the second valve block couples a rebound volume of the RR shock absorber to a compression volume of the RL shock absorber; and the second valve block couples a rebound volume of the RL shock absorber to a compression volume of the RR shock absorber.

16. The suspension system of claim 11, wherein in the fourth suspension mode:
the first valve block couples a rebound volume of the FL shock absorber to a compression volume of the FL shock absorber by a first controllable flow damper;
the first valve block couples a rebound volume of the FR shock absorber to a compression volume of the FR shock absorber by a second controllable flow damper;
the second valve block couples a rebound volume of the RR shock absorber to a compression volume of the RR shock absorber by a third controllable flow damper; and
the second valve block couples a rebound volume of the RL shock absorber to a compression volume of the RL shock absorber by a fourth controllable flow damper.

17. A method for managing a suspension system of a vehicle, the method comprising:
determining a suspension mode for the vehicle by selecting from among a plurality of suspension modes comprising:
a first suspension mode wherein a first control signal and a second control signal result in greater roll stiffness and pitch stiffness, and lesser bounce stiffness and warp stiffness,
a second suspension mode wherein the first control signal and the second control signal result in greater pitch stiffness, and lesser roll stiffness, bounce stiffness, and warp stiffness,
a third suspension mode wherein the first control signal and the second control signal result in lesser pitch stiffness, roll stiffness, bounce stiffness, and warp stiffness, and
a fourth suspension mode wherein the first control signal and the second control signal result in lesser pitch stiffness, bounce stiffness, and warp stiffness, greater roll stiffness, and variable pitch damping; and
transmitting, using control circuitry, the first control signal and the second control signal, for operating in one of the plurality of suspension modes, to a first control valve and a second control valve, respectively, wherein the first control valve and the second control valve are each coupled to a first shock absorber, a second shock absorber, a third shock absorber, and a fourth shock absorber.

18. The method of claim 17, further comprising receiving an indication to change from the one suspension mode to a new suspension mode, different from the one suspension mode, by selecting the new suspension mode from among the plurality of suspension modes based at least in part on the indication.

19. The method of claim 17, further comprising receiving one or more sensor signals from one or more sensors configured to sense suspension behavior, wherein determining the suspension mode is based at least in part on the one or more sensor signals.

* * * * *